(12) United States Patent
Van Den Brink et al.

(10) Patent No.: US 11,544,440 B2
(45) Date of Patent: Jan. 3, 2023

(54) MACHINE LEARNING BASED INVERSE OPTICAL PROXIMITY CORRECTION AND PROCESS MODEL CALIBRATION

(71) Applicant: ASML NETHERLANDS B.V., Veldhoven (NL)

(72) Inventors: Marinus Aart Van Den Brink, Moergestel (NL); Yu Cao, Saratoga, CA (US); Yi Zou, Foster City, CA (US)

(73) Assignee: ASML NETHERLANDS B.V., Veldhoven (NL)

( * ) Notice: Subject to any disclaimer, the term of this patent is extended or adjusted under 35 U.S.C. 154(b) by 0 days.

(21) Appl. No.: 15/734,141

(22) PCT Filed: May 23, 2019

(86) PCT No.: PCT/EP2019/063282
§ 371 (c)(1),
(2) Date: Dec. 1, 2020

(87) PCT Pub. No.: WO2019/238372
PCT Pub. Date: Dec. 19, 2019

(65) Prior Publication Data
US 2021/0216697 A1 Jul. 15, 2021

Related U.S. Application Data

(60) Provisional application No. 62/685,749, filed on Jun. 15, 2018.

(51) Int. Cl.
*G06F 30/398* (2020.01)
*G06F 30/392* (2020.01)
*G06F 119/18* (2020.01)

(52) U.S. Cl.
CPC .......... *G06F 30/398* (2020.01); *G06F 30/392* (2020.01); *G06F 2119/18* (2020.01)

(58) Field of Classification Search
CPC ........ G06F 30/39; G06F 30/398; G06F 30/00; G06F 30/20; G06F 2119/18; G06F 17/10;
(Continued)

(56) References Cited

U.S. PATENT DOCUMENTS 5,229,872 A 7/1993 Mumola
6,046,792 A 4/2000 Van Der Werf et al.
(Continued)

FOREIGN PATENT DOCUMENTS

KR 1020140078686 6/2014
WO 2016012316 1/2016

OTHER PUBLICATIONS

Taiwanese Office Action issued in corresponding Taiwanese Patent Application No. 109118464, dated Mar. 31, 2021.
(Continued)

*Primary Examiner* — Binh C Tat
(74) *Attorney, Agent, or Firm* — Pillsbury Winthrop Shaw Pittman LLP

(57) ABSTRACT

A method for calibrating a process model and training an inverse process model of a patterning process. The training method includes obtaining a first patterning device pattern from simulation of an inverse lithographic process that predicts a patterning device pattern based on a wafer target layout, receiving wafer data corresponding to a wafer exposed using the first patterning device pattern, and training an inverse process model configured to predict a second patterning device pattern using the wafer data related to the exposed wafer and the first patterning device pattern.

20 Claims, 14 Drawing Sheets

(58) Field of Classification Search
CPC ............... G06F 30/367; G06F 2111/04; G06F
2111/08; G06F 2111/06; G06F 30/30;
G06F 2119/12; G06F 30/33; G06F
30/337; G06F 17/18; G06F 2111/10;
G06F 17/14; G06F 30/392; G06F
2119/22; G03F 7/705; G03F 1/36; G03F
7/70441; G03F 1/70; G03F 7/70125;
G03F 7/70433; G03F 7/70516; G03F
1/20; G03F 7/2063; G03F 7/70608; G03F
9/70; G03F 9/7019; G03F 7/70283; G03F
1/76; G03F 7/7025; G03F 7/70258; G03F
1/50; G03F 7/70683; G03F 7/70616;
G03F 1/22; G03F 7/704; G03F 1/68;
G03F 7/70091; G03F 1/44; G03F 1/84;
G03F 1/62; G03F 7/70083; G03F 7/706;
G03F 7/70625; G03F 7/70483; G03F
7/7085; G03F 7/70158; G03F 7/70633;
G03F 9/7088; G03F 7/20; G03F 7/70066;
G03F 7/70425; G03F 7/70558; G03F
7/70566; G03F 7/70666; G03F 1/30;
G03F 1/32; G03F 1/78; G03F 1/80; G03F
7/70508; G03F 7/70525; G03F 7/70641;
G03F 7/7065; G03F 7/70675; H01L
21/0274; H01L 21/67213; H01L 21/027;
G01N 2021/95676; G01N 21/8851; G06T
2207/10056; G06T 7/00; G06T
2207/30148; G06T 7/001
USPC ..................................................... 716/50–56
See application file for complete search history.

(56) References Cited

U.S. PATENT DOCUMENTS

| | | | |
|---|---|---|---|
| 7,587,704 | B2 | 9/2009 | Ye et al. |
| 8,200,002 | B2* | 6/2012 | Preil .................. G06T 7/001 |
| | | | 382/144 |
| 8,279,409 | B1* | 10/2012 | Sezginer ............. G03F 1/70 |
| | | | 716/55 |
| 8,331,645 | B2* | 12/2012 | Preil .................. G03F 1/84 |
| | | | 382/144 |
| 2009/0157360 | A1 | 6/2009 | Ye et al. |
| 2010/0122225 | A1* | 5/2010 | Cao ................... G03F 1/62 |
| | | | 716/136 |
| 2016/0012579 | A1* | 1/2016 | Shi .................... G06T 7/001 |
| | | | 382/149 |
| 2017/0351952 | A1 | 12/2017 | Zhang et al. |

OTHER PUBLICATIONS

International Search Report and Written Opinion issued in corresponding PCT Patent Application No. PCT/EP2019/063282, dated Sep. 13, 2019.
Liu, F. et al.: "An Efficient Mask Optimization Method based on Homotopy Continuation Technique", 2011 Design, Automation & Test in Europe, Grenoble, 2011, IEEE, pp. 1-6 (2011).
Davids, P.S. et al.: "Generalized Inverse Problem for Partially Coherent Projection Lithography", Proc. of SPIE, vol. 6924 (2008).
Spence, C.: "Full-Chip Lithography Simulation and Design Analysis—How OPC is Changing IC Design", Proc. of SPIE, vol. 5751, (2005).
Korean Office Action issued in corresponding Korean Patent Application No. 10-2020-7035887, dated Aug. 8, 2022.

* cited by examiner

MACHINE LEARNING BASED INVERSE OPTICAL PROXIMITY CORRECTION AND PROCESS MODEL CALIBRATION

CROSS-REFERENCE TO RELATED APPLICATIONS

This application is the U.S. national phase entry of PCT patent application no. PCT/EP2019/063282, which was filed on May 23, 2019, which claims the benefit of priority of U.S. patent application No. 62/685,749, which was filed on Jun. 15, 2018, and which is incorporated herein in its entirety by reference.

TECHNICAL FIELD

The description herein relates generally to apparatus and methods of a patterning process and determining patterns of patterning device corresponding to a design layout.

BACKGROUND

A lithographic projection apparatus can be used, for example, in the manufacture of integrated circuits (ICs). In such a case, a patterning device (e.g., a mask) may contain or provide a pattern corresponding to an individual layer of the IC ("design layout"), and this pattern can be transferred onto a target portion (e.g. comprising one or more dies) on a substrate (e.g., silicon wafer) that has been coated with a layer of radiation-sensitive material ("resist"), by methods such as irradiating the target portion through the pattern on the patterning device. In general, a single substrate contains a plurality of adjacent target portions to which the pattern is transferred successively by the lithographic projection apparatus, one target portion at a time. In one type of lithographic projection apparatuses, the pattern on the entire patterning device is transferred onto one target portion in one go; such an apparatus is commonly referred to as a stepper. In an alternative apparatus, commonly referred to as a step-and-scan apparatus, a projection beam scans over the patterning device in a given reference direction (the "scanning" direction) while synchronously moving the substrate parallel or anti-parallel to this reference direction. Different portions of the pattern on the patterning device are transferred to one target portion progressively. Since, in general, the lithographic projection apparatus will have a reduction ratio M (e.g., 4), the speed F at which the substrate is moved will be 1/M times that at which the projection beam scans the patterning device. More information with regard to lithographic devices as described herein can be gleaned, for example, from U.S. Pat. No. 6,046,792, incorporated herein by reference.

Prior to transferring the pattern from the patterning device to the substrate, the substrate may undergo various procedures, such as priming, resist coating and a soft bake. After exposure, the substrate may be subjected to other procedures ("post-exposure procedures"), such as a post-exposure bake (PEB), development, a hard bake and measurement/inspection of the transferred pattern. This array of procedures is used as a basis to make an individual layer of a device, e.g., an IC. The substrate may then undergo various processes such as etching, ion-implantation (doping), metallization, oxidation, chemo-mechanical polishing, etc., all intended to finish off the individual layer of the device. If several layers are required in the device, then the whole procedure, or a variant thereof, is repeated for each layer. Eventually, a device will be present in each target portion on the substrate. These devices are then separated from one another by a technique such as dicing or sawing, whence the individual devices can be mounted on a carrier, connected to pins, etc.

Thus, manufacturing devices, such as semiconductor devices, typically involves processing a substrate (e.g., a semiconductor wafer) using a number of fabrication processes to form various features and multiple layers of the devices. Such layers and features are typically manufactured and processed using, e.g., deposition, lithography, etch, chemical-mechanical polishing, and ion implantation. Multiple devices may be fabricated on a plurality of dies on a substrate and then separated into individual devices. This device manufacturing process may be considered a patterning process. A patterning process involves a patterning step, such as optical and/or nanoimprint lithography using a patterning device in a lithographic apparatus, to transfer a pattern on the patterning device to a substrate and typically, but optionally, involves one or more related pattern processing steps, such as resist development by a development apparatus, baking of the substrate using a bake tool, etching using the pattern using an etch apparatus, etc.

As noted, lithography is a central step in the manufacturing of device such as ICs, where patterns formed on substrates define functional elements of the devices, such as microprocessors, memory chips, etc. Similar lithographic techniques are also used in the formation of flat panel displays, micro-electro mechanical systems (MEMS) and other devices.

As semiconductor manufacturing processes continue to advance, the dimensions of functional elements have continually been reduced while the amount of functional elements, such as transistors, per device has been steadily increasing over decades, following a trend commonly referred to as "Moore's law". At the current state of technology, layers of devices are manufactured using lithographic projection apparatuses that project a design layout onto a substrate using illumination from a deep-ultraviolet illumination source, creating individual functional elements having dimensions well below 100 nm, i.e. less than half the wavelength of the radiation from the illumination source (e.g., a 193 nm illumination source).

This process in which features with dimensions smaller than the classical resolution limit of a lithographic projection apparatus are printed, is commonly known as low-$k_1$ lithography, according to the resolution formula $CD=k_1 \times \lambda/NA$, where $\lambda$ is the wavelength of radiation employed (currently in most cases 248 nm or 193 nm), NA is the numerical aperture of projection optics in the lithographic projection apparatus, CD is the "critical dimension"—generally the smallest feature size printed—and $k_1$ is an empirical resolution factor. In general, the smaller $k_1$ the more difficult it becomes to reproduce a pattern on the substrate that resembles the shape and dimensions planned by a designer in order to achieve particular electrical functionality and performance. To overcome these difficulties, sophisticated fine-tuning steps are applied to the lithographic projection apparatus, the design layout, or the patterning device. These include, for example, but not limited to, optimization of NA and optical coherence settings, customized illumination schemes, use of phase shifting patterning devices, optical proximity correction (OPC, sometimes also referred to as "optical and process correction") in the design layout, or other methods generally defined as "resolution enhancement techniques" (RET). The term "projection optics" as used herein should be broadly interpreted as encompassing various types of optical systems, including refractive optics, reflective optics, apertures and catadioptric optics, for example. The term "projection optics" may also include components operating according to any of these design types for directing, shaping or controlling the projection beam of radiation, collectively or singularly. The term "projection optics" may include any optical component in the lithographic projection apparatus, no matter where the optical component is located on an optical path of the lithographic projection apparatus. Projection optics may include optical components for shaping, adjusting and/or projecting radiation from the source before the radiation passes the patterning device, and/or optical components for shaping, adjusting and/or projecting the radiation after the radiation passes the patterning device. The projection optics generally exclude the source and the patterning device.

SUMMARY

According to an embodiment, the present disclosure describes a method for calibrating a process model of a patterning process. The method includes obtaining a patterning device pattern from simulation of an inverse lithographic process that predicts the patterning device pattern based on a wafer target layout, receiving wafer data corresponding to a wafer exposed using the patterning device pattern, and calibrating a process model of the patterning process based on the wafer data related to the exposed wafer and the patterning device pattern.

In an embodiment, the calibrating the process model is an iterative process. An iteration includes determining values of model parameters of the process model based on the wafer data and the patterning device pattern, adjusting the values of the model parameters until a first cost function of the process model is improved.

In an embodiment, the first cost function is a difference between the wafer data and a predicted pattern obtained from the calibrated process model. In an embodiment, the difference is measured in terms of a performance parameter of the patterning process including at least one of a contour of a feature, critical dimension, and/or a process window.

In an embodiment, the simulation of the inverse lithographic process involves simulation of: a mask model configured to predict a mask image from the patterning device pattern; an optical model configured to predict an aerial image corresponding to the patterning device pattern, a resist model configured to predict a resist image corresponding to the patterning device pattern; and/or an etch model configured to predict an etch image corresponding to the patterning device pattern.

In an embodiment, the simulation of the inverse lithographic process is an iterative process. An iteration includes obtaining an initial patterning device pattern; determining, via simulation of the process model, a simulated wafer pattern on the wafer based on the initial patterning device pattern; evaluating a second cost function, wherein the second cost function computes a difference between the simulated pattern and the wafer target layout; and adjusting the initial patterning device pattern such that the second cost function is reduced.

In an embodiment, the wafer data comprises measurements related to a feature printed on the wafer including a critical dimension, a contour of the feature, and/or a process window.

In an embodiment, the measurements are based on an image of the exposed wafer obtained from an e-beam inspection apparatus and/or an optical inspection apparatus.

In an embodiment, the e-beam inspection apparatus is a scanning electron microscope.

In an embodiment, the wafer target layout includes a pattern corresponding to a design layout that will be printed on the wafer subjected to the patterning process.

In an embodiment, the process model is a mask model, an optical model, a resist model, and/or an etch model.

In an embodiment, the process model is a physics based model and/or a machine learning model.

Furthermore, according to an embodiment, the present disclosure describes a method for training an inverse process model of a patterning process The method includes obtaining a first patterning device pattern from simulation of an inverse lithographic process that predicts a patterning device pattern based on a wafer target layout, receiving, via a processor, wafer data corresponding to a wafer exposed using the first patterning device pattern; and training, via the processor, an inverse process model configured to predict a second patterning device pattern using the wafer data related to the exposed wafer and the first patterning device pattern.

In an embodiment, the inverse process model is a machine learning model configured to predict the second patterning device pattern using the wafer target layout as input.

In an embodiment, the machine learning model is a convolutional neural network.

In an embodiment, the training the inverse process model is an iterative process. An iteration includes determining values of model parameters of the convolutional neural network based on the wafer data and the patterning device pattern; and adjusting the values of the model parameters until a first cost function of the convolutional neural network is improved.

In an embodiment, the first cost function is a difference between the patterning device pattern and a predicted patterning device pattern obtained from the convolution neural network.

In an embodiment, the wafer data comprises measurements related to a feature printed on the wafer including a critical dimension, a contour of the feature, and/or a process window.

In an embodiment, the wafer target layout includes a pattern corresponding to a design layout that will be printed on the wafer subjected to the patterning process.

In an embodiment, the method further includes predicting, via simulation of the trained inverse process model, a patterning device pattern based on a given wafer target layout.

Furthermore, according to an embodiment, the present disclosure describes a method for determining a patterning device layout for a patterning process. The method includes obtaining an initial patterning device pattern from a trained inverse process model that predicts the initial patterning device pattern from wafer target layout; determining, via simulation of a calibrated process model, a patterning device layout based on the initial patterning device pattern and a wafer target layout.

In an embodiment, the determining of the patterning device layout is an iterative process. An iteration includes obtaining the initial patterning device pattern; determining, via simulation of the calibrated process model, a simulated wafer pattern on the wafer based on the initial patterning device pattern; evaluating a cost function, wherein the cost function computes a difference between the simulated pattern and the wafer target layout; and adjusting the initial patterning device pattern such that the cost function is reduced.

In an embodiment, the calibrated process model of the patterning process is calibrated based on wafer data related to the exposed wafer and the patterning device pattern from a simulation of an inverse lithographic process.

In an embodiment, the wafer data comprises measurements related to a feature printed on the wafer including a critical dimension, a contour of the feature, and/or a process window.

In an embodiment, the initial patterning device pattern is a final patterning device layout that does not require adjustment to the initial patterning device pattern.

BRIEF DESCRIPTION OF THE DRAWINGS

Embodiments will now be described, by way of example only, with reference to the accompanying drawings in which.

DETAILED DESCRIPTION

Figure 1:
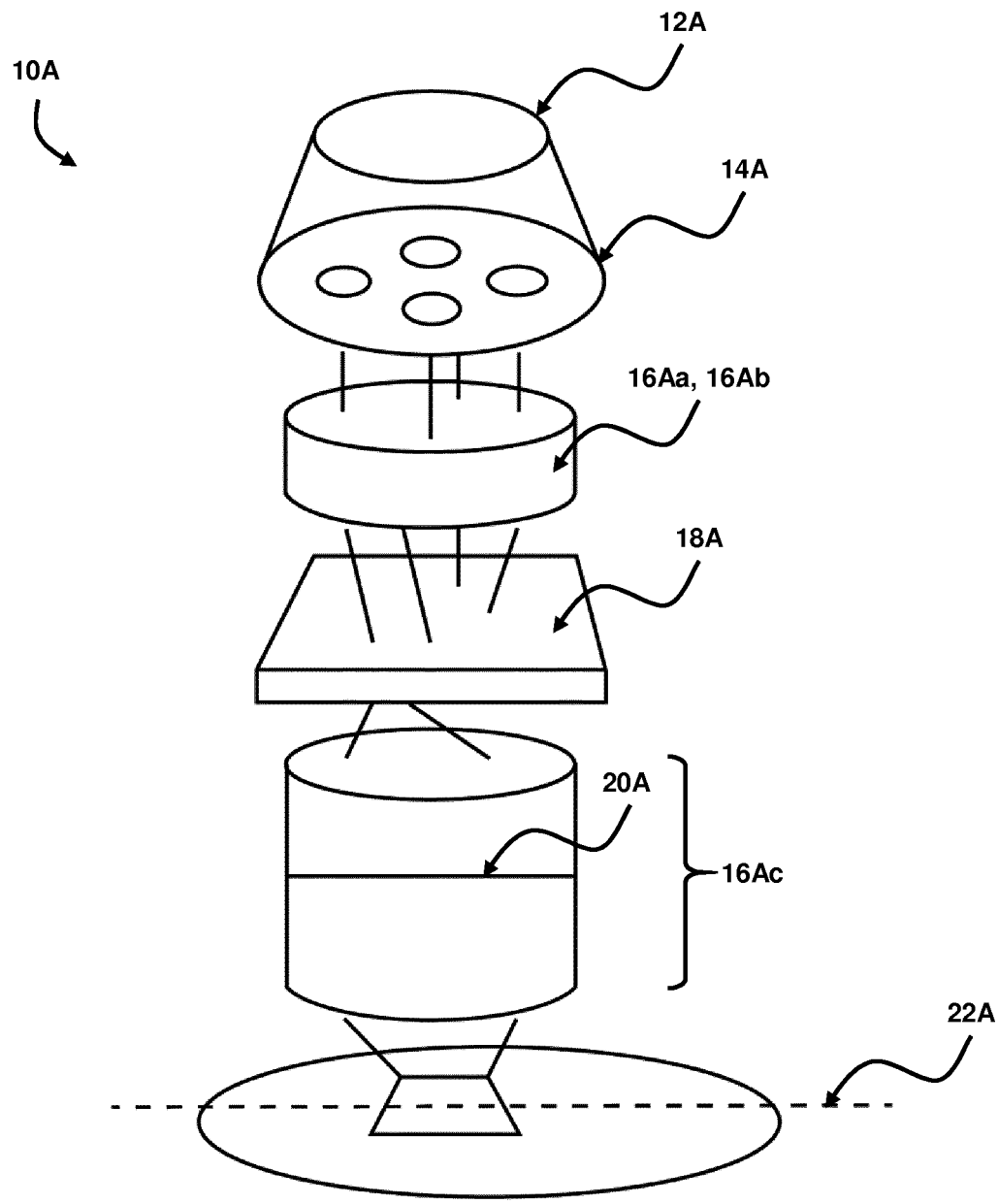
FIG. 1 shows a block diagram of various subsystems of a lithography system, according to an embodiment.

Although specific reference may be made in this text to the manufacture of ICs, it should be explicitly understood that the description herein has many other possible applications. For example, it may be employed in the manufacture of integrated optical systems, guidance and detection patterns for magnetic domain memories, liquid-crystal display panels, thin-film magnetic heads, etc. The skilled artisan will appreciate that, in the context of such alternative applications, any use of the terms "reticle", "wafer" or "die" in this text should be considered as interchangeable with the more general terms "mask", "substrate" and "target portion", respectively.

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The patterning device can comprise, or can form, one or more design layouts. The design layout can be generated utilizing CAD (computer-aided design) programs, this process often being referred to as EDA (electronic design automation). Most CAD programs follow a set of predetermined design rules in order to create functional design layouts/patterning devices. These rules are set by processing and design limitations. For example, design rules define the space tolerance between devices (such as gates, capacitors, etc.) or interconnect lines, so as to ensure that the devices or lines do not interact with one another in an undesirable way. One or more of the design rule limitations may be referred to as "critical dimension" (CD). A critical dimension of a device can be defined as the smallest width of a line or hole or the smallest space between two lines or two holes. Thus, the CD determines the overall size and density of the designed device. Of course, one of the goals in device fabrication is to faithfully reproduce the original design intent on the substrate (via the patterning device).

The pattern layout design may include, as an example, application of resolution enhancement techniques, such as optical proximity corrections (OPC). OPC addresses the fact that the final size and placement of an image of the design layout projected on the substrate will not be identical to, or simply depend only on the size and placement of the design layout on the patterning device. It is noted that the terms "mask", "reticle", "patterning device" are utilized interchangeably herein. Also, person skilled in the art will recognize that, the term "mask," "patterning device" and "design layout" can be used interchangeably, as in the context of RET, a physical patterning device is not necessarily used but a design layout can be used to represent a physical patterning device. For the small feature sizes and high feature densities present on some design layout, the position of a particular edge of a given feature will be influenced to a certain extent by the presence or absence of other adjacent features. These proximity effects arise from minute amounts of radiation coupled from one feature to another or non-geometrical optical effects such as diffraction and interference. Similarly, proximity effects may arise from diffusion and other chemical effects during post-exposure bake (PEB), resist development, and etching that generally follow lithography.

In order to increase the chance that the projected image of the design layout is in accordance with requirements of a given target circuit design, proximity effects may be predicted and compensated for, using sophisticated numerical models, corrections or pre-distortions of the design layout. The article "Full-Chip Lithography Simulation and Design Analysis—How OPC Is Changing IC Design", C. Spence, Proc. SPIE, Vol. 5751, pp 1-14 (2005) provides an overview of current "model-based" optical proximity correction processes. In a typical high-end design almost every feature of the design layout has some modification in order to achieve high fidelity of the projected image to the target design. These modifications may include shifting or biasing of edge positions or line widths as well as application of "assist" features that are intended to assist projection of other features.

One of the simplest forms of OPC is selective bias. Given a CD vs. pitch curve, all of the different pitches could be forced to produce the same CD, at least at best focus and exposure, by changing the CD at the patterning device level. Thus, if a feature prints too small at the substrate level, the patterning device level feature would be biased to be slightly larger than nominal, and vice versa. Since the pattern transfer process from patterning device level to substrate level is non-linear, the amount of bias is not simply the measured CD error at best focus and exposure times the reduction ratio, but with modeling and experimentation an appropriate bias can be determined. Selective bias is an incomplete solution to the problem of proximity effects, particularly if it is only applied at the nominal process condition. Even though such bias could, in principle, be applied to give uniform CD vs. pitch curves at best focus and exposure, once the exposure process varies from the nominal condition, each biased pitch curve will respond differently, resulting in different process windows for the different features. A process window being a range of values of two or more process parameters (e.g., focus and radiation dose in the lithographic apparatus) under which a feature is sufficiently properly created (e.g., the CD of the feature is within a certain range such as ±10% or ±5%). Therefore, the "best" bias to give identical CD vs. pitch may even have a negative impact on the overall process window, reducing rather than enlarging the focus and exposure range within which all of the target features print on the substrate within the desired process tolerance.

Other more complex OPC techniques have been developed for application beyond the one-dimensional bias example above. A two-dimensional proximity effect is line end shortening. Line ends have a tendency to "pull back" from their desired end point location as a function of exposure and focus. In many cases, the degree of end shortening of a long line end can be several times larger than the corresponding line narrowing. This type of line end pull back can result in catastrophic failure of the devices being manufactured if the line end fails to completely cross over the underlying layer it was intended to cover, such as a polysilicon gate layer over a source-drain region. Since this type of pattern is highly sensitive to focus and exposure, simply biasing the line end to be longer than the design length is inadequate because the line at best focus and exposure, or in an underexposed condition, would be excessively long, resulting either in short circuits as the extended line end touches neighboring structures, or unnecessarily large circuit sizes if more space is added between individual features in the circuit. Since one of the goals of integrated circuit design and manufacturing is to maximize the number of functional elements while minimizing the area required per chip, adding excess spacing is an undesirable solution.

Two-dimensional OPC approaches may help solve the line end pull back problem. Extra structures (also known as "assist features") such as "hammerheads" or "serifs" may be added to line ends to effectively anchor them in place and provide reduced pull back over the entire process window. Even at best focus and exposure these extra structures are not resolved but they alter the appearance of the main feature without being fully resolved on their own. A "main feature" as used herein means a feature intended to print on a substrate under some or all conditions in the process window. Assist features can take on much more aggressive forms than simple hammerheads added to line ends, to the extent the pattern on the patterning device is no longer simply the desired substrate pattern upsized by the reduction ratio. Assist features such as serifs can be applied for many more situations than simply reducing line end pull back. Inner or outer serifs can be applied to any edge, especially two dimensional edges, to reduce corner rounding or edge extrusions. With enough selective biasing and assist features of all sizes and polarities, the features on the patterning device bear less and less of a resemblance to the final pattern desired at the substrate level. In general, the patterning device pattern becomes a pre-distorted version of the substrate-level pattern, where the distortion is intended to counteract or reverse the pattern deformation that will occur during the manufacturing process to produce a pattern on the substrate that is as close to the one intended by the designer as possible.

Another OPC technique involves using completely independent and non-resolvable assist features, instead of or in addition to those assist features (e.g., serifs) connected to the main features. The term "independent" here means that edges of these assist features are not connected to edges of the main features. These independent assist features are not intended or desired to print as features on the substrate, but rather are intended to modify the aerial image of a nearby main feature to enhance the printability and process tolerance of that main feature. These assist features (often referred to as "scattering bars" or "SBAR") can include sub-resolution assist features (SRAF) which are features outside edges of the main features and sub-resolution inverse features (SRIF) which are features scooped out from inside the edges of the main features. The presence of a SBAR adds yet another layer of complexity to a patterning device pattern. A simple example of a use of scattering bars is where a regular array of non-resolvable scattering bars is drawn on both sides of an isolated line feature, which has the effect of making the isolated line appear, from an aerial image standpoint, to be more representative of a single line within an array of dense lines, resulting in a process window much closer in focus and exposure tolerance to that of a dense pattern. The common process window between such a decorated isolated feature and a dense pattern will have a larger common tolerance to focus and exposure variations than that of a feature drawn as isolated at the patterning device level.

An assist feature may be viewed as a difference between features on a patterning device and features in the design layout. The terms "main feature" and "assist feature" do not imply that a particular feature on a patterning device must be labeled as one or the other.

The term "mask" or "patterning device" as employed in this text may be broadly interpreted as referring to a generic patterning device that can be used to endow an incoming radiation beam with a patterned cross-section, corresponding to a pattern that is to be created in a target portion of the substrate; the term "light valve" can also be used in this context. Besides the classic mask (transmissive or reflective; binary, phase-shifting, hybrid, etc.), examples of other such patterning devices include:

a programmable mirror array. An example of such a device is a matrix-addressable surface having a viscoelastic control layer and a reflective surface. The basic principle behind such an apparatus is that (for example) addressed areas of the reflective surface reflect incident radiation as diffracted radiation, whereas unaddressed areas reflect incident radiation as undiffracted radiation. Using an appropriate filter, the said undiffracted radiation can be filtered out of the reflected beam, leaving only the diffracted radiation behind; in this manner, the beam becomes patterned according to the addressing pattern of the matrix-addressable surface. The required matrix addressing can be performed using suitable electronic means.

a programmable LCD array. An example of such a construction is given in U.S. Pat. No. 5,229,872, which is incorporated herein by reference.

As a brief introduction, FIG. 1 illustrates an exemplary lithographic projection apparatus 10A. Major components are a radiation source 12A, which may be a deep-ultraviolet excimer laser source or other type of source including an extreme ultra violet (EUV) source (as discussed above, the lithographic projection apparatus itself need not have the radiation source), illumination optics which, e.g., define the partial coherence (denoted as sigma) and which may include optics 14A, 16Aa and 16Ab that shape radiation from the source 12A; a patterning device 18A; and transmission optics 16Ac that project an image of the patterning device pattern onto a substrate plane 22A. An adjustable filter or aperture 20A at the pupil plane of the projection optics may restrict the range of beam angles that impinge on the substrate plane 22A, where the largest possible angle defines the numerical aperture of the projection optics NA=n sin $(\Theta_{max})$, wherein n is the refractive index of the media between the substrate and the last element of the projection optics, and $\Theta_{max}$ is the largest angle of the beam exiting from the projection optics that can still impinge on the substrate plane 22A.

In a lithographic projection apparatus, a source provides illumination (i.e. radiation) to a patterning device and projection optics direct and shape the illumination, via the patterning device, onto a substrate. The projection optics may include at least some of the components 14A, 16Aa, 16Ab and 16Ac. An aerial image (AI) is the radiation intensity distribution at substrate level. A resist layer on the substrate is exposed and the aerial image is transferred to the resist layer as a latent "resist image" (RI) therein. The resist image (RI) can be defined as a spatial distribution of solubility of the resist in the resist layer. A resist model can be used to calculate the resist image from the aerial image, an example of which can be found in U.S. Patent Application Publication No. US 2009-0157360, the disclosure of which is hereby incorporated by reference in its entirety. The resist model is related only to properties of the resist layer (e.g., effects of chemical processes which occur during exposure, PEB and development). Optical properties of the lithographic projection apparatus (e.g., properties of the source, the patterning device and the projection optics) dictate the aerial image. Since the patterning device used in the lithographic projection apparatus can be changed, it may be desirable to separate the optical properties of the patterning device from the optical properties of the rest of the lithographic projection apparatus including at least the source and the projection optics.

In an embodiment, assist features (sub resolution assist features and/or printable resolution assist features) may be placed into the design layout based on how the design layout optimized according to the methods of the present disclosure. For example, in an embodiment, the methods employ a machine learning based model to determine a patterning device pattern. The machine learning model may be a neural network such as a convolution neural network that can be trained in a certain way (e.g., as discussed in FIG. 3) to obtain accurate predictions at a fast rate, thus enabling a full-chip simulation of the patterning process.

A neural network may be trained (i.e., whose parameters are determined) using a set of training data. The training data may comprise or consist of a set of training samples. Each sample may be a pair comprising or consisting of an input object (typically a vector, which may be called a feature vector) and a desired output value (also called the supervisory signal). A training algorithm analyzes the training data and adjusts the behavior of the neural network by adjusting the parameters (e.g., weights of one or more layers) of the neural network based on the training data. The neural network after training can be used for mapping new samples.

In the context of determining a patterning device pattern, the feature vector may include one or more characteristics (e.g., shape, arrangement, size, etc.) of the design layout comprised or formed by the patterning device, one or more characteristics (e.g., one or more physical properties such as a dimension, a refractive index, material composition, etc.) of the patterning device, and one or more characteristics (e.g., the wavelength) of the illumination used in the lithographic process. The supervisory signal may include one or more characteristics of the patterning device pattern (e.g., CD, contour, etc. of the patterning device pattern).

Given a set of N training samples of the form $\{(x_1, y_1), (x_2, y_2), \ldots, (x_N, y_N)\}$ such that $x_i$ is the feature vector of the i-th example and $y_i$ is its supervisory signal, a training algorithm seeks a neural network g: X→Y, where X is the input space and Y is the output space. A feature vector is an n-dimensional vector of numerical features that represent some object. The vector space associated with these vectors is often called the feature space. It is sometimes convenient to represent g using a scoring function f: X×Y→ℝ such that g is defined as returning the y value that gives the highest score:

$$g(x) = \arg\max_y f(x, y).$$

Let F denote the space of scoring functions.

The neural network may be probabilistic where g takes the form of a conditional probability model g(x)=P(y|x), or f takes the form of a joint probability model f(x, y)=P(x, y).

There are two basic approaches to choosing f or g: empirical risk minimization and structural risk minimization. Empirical risk minimization seeks the neural network that best fits the training data. Structural risk minimization includes a penalty function that controls the bias/variance tradeoff. For example, in an embodiment, the penalty function may be based on a cost function, which may be a squared error, number of defects, EPE, etc. The functions (or weights within the function) may be modified so that the variance is reduced or minimized.

In both cases, it is assumed that the training set comprises or consists of one or more samples of independent and identically distributed pairs $(x_i, y_i)$. In an embodiment, in order to measure how well a function fits the training data, a loss function L: Y×Y→ℝ $^{\geq 0}$ is defined. For training sample $(x_i, y_i)$, the loss of predicting the value ŷ is L($y_i$, ŷ).

The risk R(g) of function g is defined as the expected loss of g. This can be estimated from the training data as $$R_{emp}(g) = \frac{1}{N}\Sigma_i \; L(y_i, g(x_i)).$$

In an embodiment, machine learning models of the patterning process can be trained to predict, for example, contours, patterns, CDs for a mask pattern, and/or contours, CDs, edge placement (e.g., edge placement error), etc. in the resist and/or etched image on a wafer. An objective of the training is to enable accurate prediction of, for example, contours, aerial image intensity slope, and/or CD, etc. of the printed pattern on a wafer. The intended design (e.g., a wafer target layout to be printed on a wafer) is generally defined as a pre-OPC design layout which can be provided in a standardized digital file format such as GDSII or OASIS or other file format.

Modeling of the patterning process is an important part of computational lithography applications. Particularly, as lithography moves deeper into the low-k1 regime, mask pattern optimization is critical to compensate for imaging (i.e., patterning) errors due to diffraction or process effects/variations. Conventional mask pattern optimization methods have evolved from rule-based OPC (Optical Proximity Correction) to model-based OPC and Inverse OPC.

Rule-based OPC is driven by pre-computed lookup tables based on width and spacing between features. Model-based OPC uses calibrated lithographic models to iteratively simulate a final pattern of a mask and thereby drive movement of an edge of the patterns. Inverse OPC treats the OPC as an inverse imaging problem. The optical transform from a mask pattern to a wafer pattern is solved in reverse (i.e., from a wafer pattern to derive a mask pattern) using a rigorous mathematical approach so that best possible theoretical mask pattern may be identified.

The key metrics and challenges in OPC are the full-chip runtime and convergence that determine how well the mask pattern reproduces the intended design layout (e.g., provided by a designer) on the wafer. Because of the large amount of data to be processed (e.g., related to billions of transistors on a wafer or a chip), the runtime specification imposes severe constraints on the complexity of the inverse OPC algorithm. Meanwhile, the OPC convergence specification becomes tighter as size of the patterns to be printed become smaller (e.g., less than 20 nm or even single digits nm) in size.

Currently, the inverse OPC involves models using non-linear optimization algorithms (such as Broyden-Fletcher-Goldfarb-Shanno (BFGS)) which typically requires calculation of gradients (i.e., derivative of a cost function at a wafer level relative to variables corresponding to a mask). Such algorithms are typically computationally intensive, and may be suitable for a clip level applications only. A clip level refers to a portion of a wafer die (i.e., a chip) on which a selected pattern is printed; the wafer die may have hundreds or thousands of such clips making the simulation process computationally intensive. As such, not only faster models are needed, but also models that can produce more accurate result than existing models are needed to enable printing of features and patterns of smaller sizes (e.g., less than 20 nm to single-digit nm) on the wafer.

Machine learning based process model (e.g., an inverse process model for mask optimization), according to present disclosure, provides benefits such as (i) improved accuracy of prediction of, for example, a mask pattern and/or a wafer pattern, (ii) substantially reduced runtime (e.g., by more than 10×, 100×, etc.) for any design layout for which a mask layout may be determined, which may also improve the computation time of the computer(s) used in the patterning process.

Figure 2:
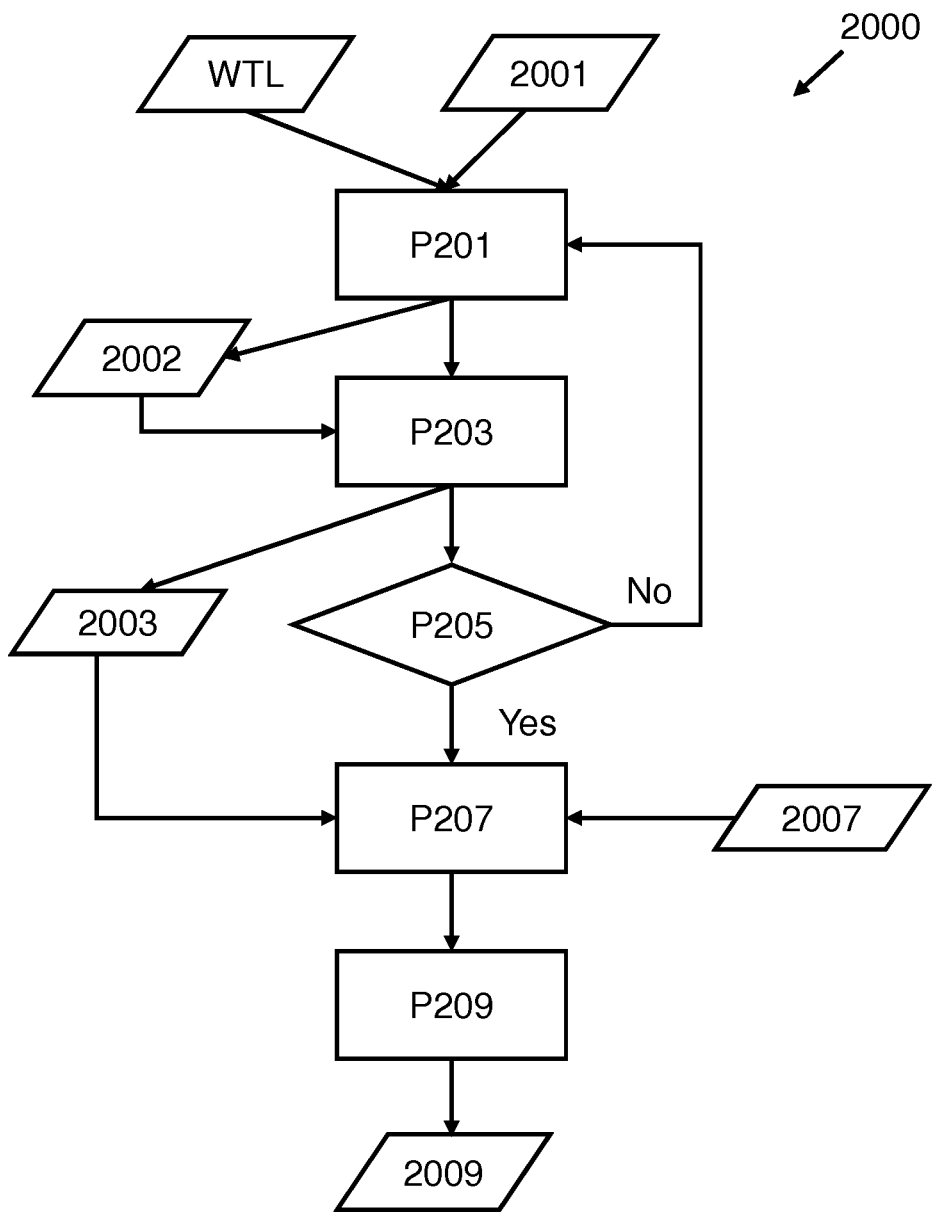
FIG. 2 is a flow chart of a method for calibrating a process model of a patterning process, according to an embodiment.

FIG. 2 is a flow chart of a method 2000 for calibrating, via a processor (e.g., a processor 104 in FIG. 9), a process model of a patterning process. The method 2000 involves obtaining a patterning device pattern 2003 (also referred as mask pattern 2003 hereinafter) from simulation of an inverse lithographic process (e.g., processes P201, P203 and P205, explained later) that predicts the mask pattern 2003 based on a wafer target layout WTL. In an embodiment, the simulation of the inverse lithographic process involves optimization of the mask pattern 2003 based on a wafer target layout WTL. The optimization process involves reconfiguring features of the initial mask pattern by progressively correcting or adjusting the initial mask pattern until the inverse lithographic process converges (i.e., no further improvement in the mask pattern is observed). In an embodiment, such adjusting of the initial mask pattern is referred as optical proximity correction (OPC). Typically, the mask pattern 2003 obtained is a curvilinear mask pattern, where one or more features (e.g., including SRAF, Sherifs, etc.) are curve shaped. Using a curvilinear mask patterns for patterning eventually produces better wafer patterns compared to conventional mask such as having Manhattan patterns, thus improving yield and accuracy of printed patterns.

In an embodiment, the mask pattern is further used to expose a wafer (or a substrate in general) via a patterning apparatus (e.g., lithographic apparatus) to determine an actual pattern that will be printed on the wafer. Then, wafer data (e.g., SEM image 5020) may be obtained from the printed wafer using a metrology tool (e.g., SEM (refer FIGS. 7-8 for detailed discussion), YieldStar, etc.). The wafer data and the mask pattern is then used to calibrate one or more process model of the patterning process using, for example, a first cost function (discussed later). The method 2000 is now described in detail as follows.

Process P201 is part of an inverse lithographic process that involves simulation of one or more process model configured to predict a pattern at a wafer-level. As shown, the simulation of the inverse lithographic process is an iterative process (e.g., processes P201, P203 and P205, explained later). An iteration includes, in process P201, obtaining an initial patterning device pattern 2001 (referred as an initial mask pattern 2001 hereinafter). The initial mask pattern 2001 may be obtained from another inverse lithographic process, a design layout, or from a library of mask patterns. The initial mask pattern 2001 may be associated with a clip of a full chip and may be provided in digital form such as a pixelated image or a vector representing features of the initial mask pattern.

Furthermore, the process P201 involves determining, via simulation of the one or more process models, a simulated wafer pattern 2002 on the wafer based on the initial mask pattern 2001. The simulated wafer pattern 2002 refers to a predicted pattern that may be printed on the wafer when subjected to the patterning process using a mask pattern, for example, the initial mask pattern 2001 or a subsequent modified mask pattern.

In an embodiment, a process model can be a mask model configured to predict a mask image from the patterning device pattern, an optical model configured to predict an aerial image corresponding to the patterning device pattern, a resist model configured to predict a resist image corresponding to the patterning device pattern, an etch model configured to predict an etch image corresponding to the patterning device pattern, or a combination thereof. An example simulation process of the lithographic process is discussed with respect to FIG. 6.

In an embodiment, the one or more process model used in the inverse lithographic process may be a physics based model, an empirical model, a machine learning model, or a combination thereof. The present disclosure is not limited to a type of model, any model that can predict process results accurately can be employed herein.

The method 2000, in process P203, involves evaluating a second cost function, which computes a difference between the simulated wafer pattern 2002 and the wafer target layout WTL. In an embodiment, the wafer target layout WTL is a desired layout or a desired pattern to be printed on the wafer. In an embodiment, the wafer layout includes a pattern corresponding to a design layout that will be printed on the wafer subjected to the patterning process. In an embodiment, the second cost function is based on a performance parameter of the patterning process including at least one of a contour of a feature, and/or critical dimension. In an embodiment, based on a contour difference, a metric may be defined as, for example, a difference in area of a simulated pattern 2002 and wafer target layout pattern (e.g., area of a rectangle or a circle), or an edge placement error between the simulated wafer pattern 2002 and corresponding patterns of the wafer target layout.

In process P205, a determination is made whether the second cost function is improved. In an embodiment, an improvement in the second cost function may refer to reducing (or minimizing) a cost metric, for example, minimizing EPE or CD error. In an embodiment, the process P205 may involve determination of whether a convergence criteria is met. In other words, no further improvement in output of the process model is observed for additional adjustments to the initial mask pattern and the model is considered to be converged or calibrated. The convergence criteria is a threshold value that indicates a stopping point of the calibration process. The threshold value may be expressed in terms of, for example, number of iterations, EPE, CD, etc.

Furthermore, process P205 (or alternatively the process P201) involves adjusting the initial mask pattern 2001 such that the second cost function is improved (in an embodiment, reduced). In an embodiment, the adjustment refers to modifying the shape and size of a feature within the initial mask pattern 2001 based on a gradient of the second cost function computed with respect to mask related parameters. In an embodiment, the initial mask pattern 2001 may be represented as a pixelated image. In this case, the gradient may be computed with respect to intensities of the pixels. The gradient can be a multi-variable map indicating variation of the second cost function with respect to a parameter. In an embodiment, the map guides or determines a direction (e.g., increase or decrease a value of a pixel) in which a particular mask pattern should be modified to reduce (or minimize) the value of the second cost function. In an embodiment, assist features (e.g., SRAF) may be added during the adjustment of the initial mask pattern 2001.

For example, a gradient of the second cost function may be computed as dcost/dvar, where "cost" may be square of EPE (i.e., $EPE^2$) and var may be the pixel values of the initial mask pattern (e.g., in the form of pixelated image). In an embodiment, a function $f$ may be defined that derive contours from a predict wafer pattern 2002 and then calculate the EPE with respect to the wafer target.

Figure 8:
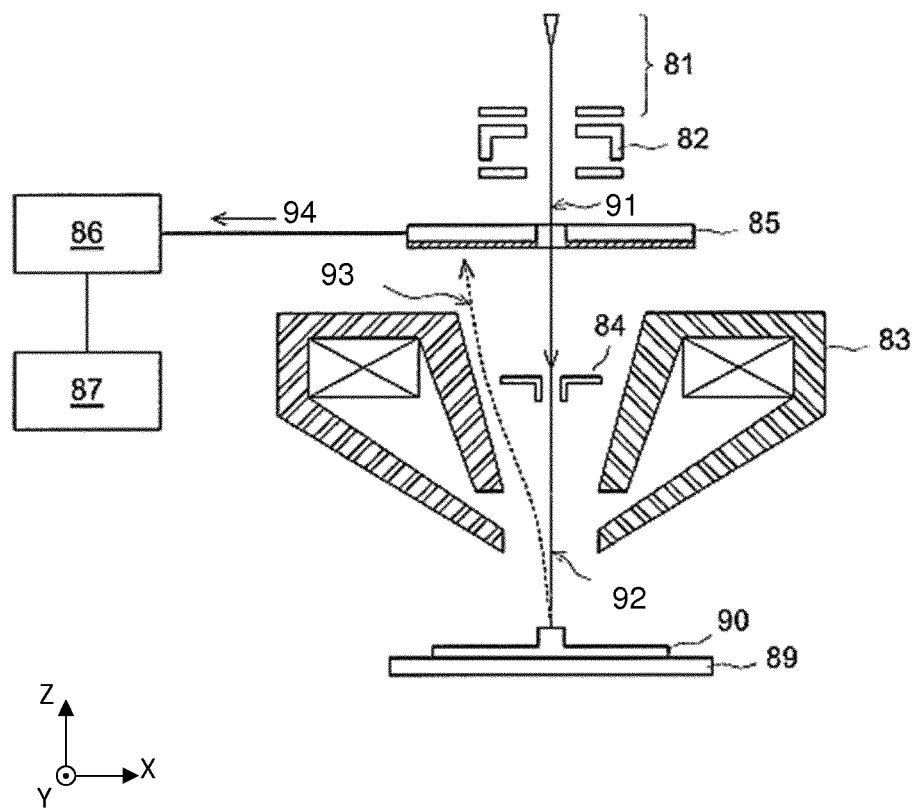
FIG. 8 schematically depicts an embodiment of an electron beam inspection apparatus, according to an embodiment.
Figure 9:
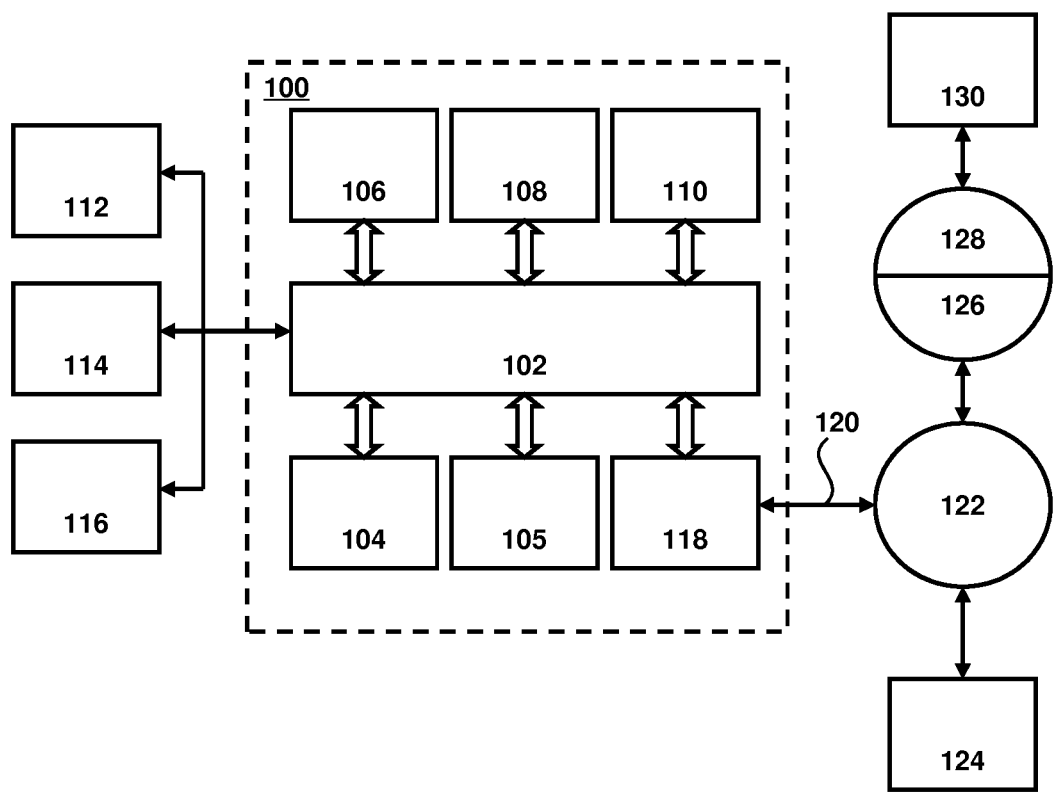
FIG. 9 is a block diagram of an example computer system, according to an embodiment.

Once the inverse lithographic process determines the mask pattern 2003, process P207 involves receiving, via a processor (e.g., a processor 104 or a network link 120 in communication with the process 104 of FIG. 9), wafer data 2007 related to a wafer exposed (e.g., via a lithographic apparatus) using the mask pattern 2003. The exposed wafer (e.g., SEM image 5020 in FIG. 5C) should include patterns similar to a desired pattern or the design layout or the wafer target layout. Further, in an embodiment, the exposed wafer may be measured, for example, via a metrology tool (e.g., SEM (discussed with respect to FIG. 7-8), YieldStar, etc.) to obtain wafer data 2007. The wafer data 2007 comprises measurements related to a feature printed on the wafer including a critical dimension, a contour of the feature, an edge placement error, and/or a process window (e.g., dose and focus measurements). In an embodiment, the contour of the feature printed on the wafer may be derived from an SEM image, via image processing, configured to identify boundaries of the features within an image (e.g., a grey scale image of the printed pattern).

Further, process P209 involves calibrating the process model of the patterning process based on the wafer data 2007 related to the exposed wafer and the mask pattern 2003 used during the patterning step. The calibration of the process model is an iterative process. An iteration includes determining values of model parameters of the process model based on the wafer data 2007 and the mask pattern 2003, and adjusting the values of the model parameters until a first cost function of the process model is improved. In an embodiment, the first cost function is a difference between the wafer data 2007 and a predicted wafer pattern 2002 obtained from the process model (or the calibrated process model, e.g., at a last iteration). In an embodiment, the difference with reference to the first cost function is measured in terms of a performance parameter of the patterning process including at least one of a contour of a feature, critical dimension, and/or a process window. In an embodiment, based on the contour difference, a metric may be defined as, for example, a difference in area of the predicted pattern and the wafer data (e.g., area of a rectangle or a circle), or an edge placement error between the predicted pattern and the wafer data. In other words, the first cost function can be, for example, a difference between the area of the predicted pattern and the wafer data (i.e., printed wafer pattern). Thereby, an improvement in the first cost function refers to reducing (or minimizing) a difference between a simulated contour/cd/edge placement and a wafer contour/cd/edge placement, at different focus and dose conditions.

In an embodiment, the first cost function may be a statistical error determined with respect to the process model results and the measured wafer data 2007 (obtained with respect to the mask pattern 2003 as input). For example, the first cost function can be a mean squared error, other statistical errors or goodness of fit (e.g., between measured wafer data and the predicted pattern) measures defined in terms of the aforementioned difference.

In an embodiment, the process model to be calibrated may be a mask model, an optical model, a resist model, and/or an etch model. In an embodiment, the process model is a physics based model, a machine learning model, or a combination thereof. For example, the process model can be a physics-based optical model configured to predict an aerial image, and/or a machine learning based mask 3D model configured to predict a mask image from the mask pattern 2003, or a combination of aforementioned mask model and the optical model. The aforementioned models to be calibrated are only exemplary, and do not limit the scope of the present disclosure.

The above method has several advantages. The calibrated process model is capable of predicting results (e.g., a simulated wafer pattern or an aerial image) more accurately, since accurate mask patterns obtained from the inverse lithographic process are used as inputs. An increased accuracy of the calibrated process model effectively provides increased yield (e.g., less defects) and in some cases an accurate printed patterns for a given process window. In an embodiment, the calibrated process model 2009 improves pattern coverage, enabled by inverse mask patterns, which are closer to actual patterns used on a physical mask.

Figure 3:
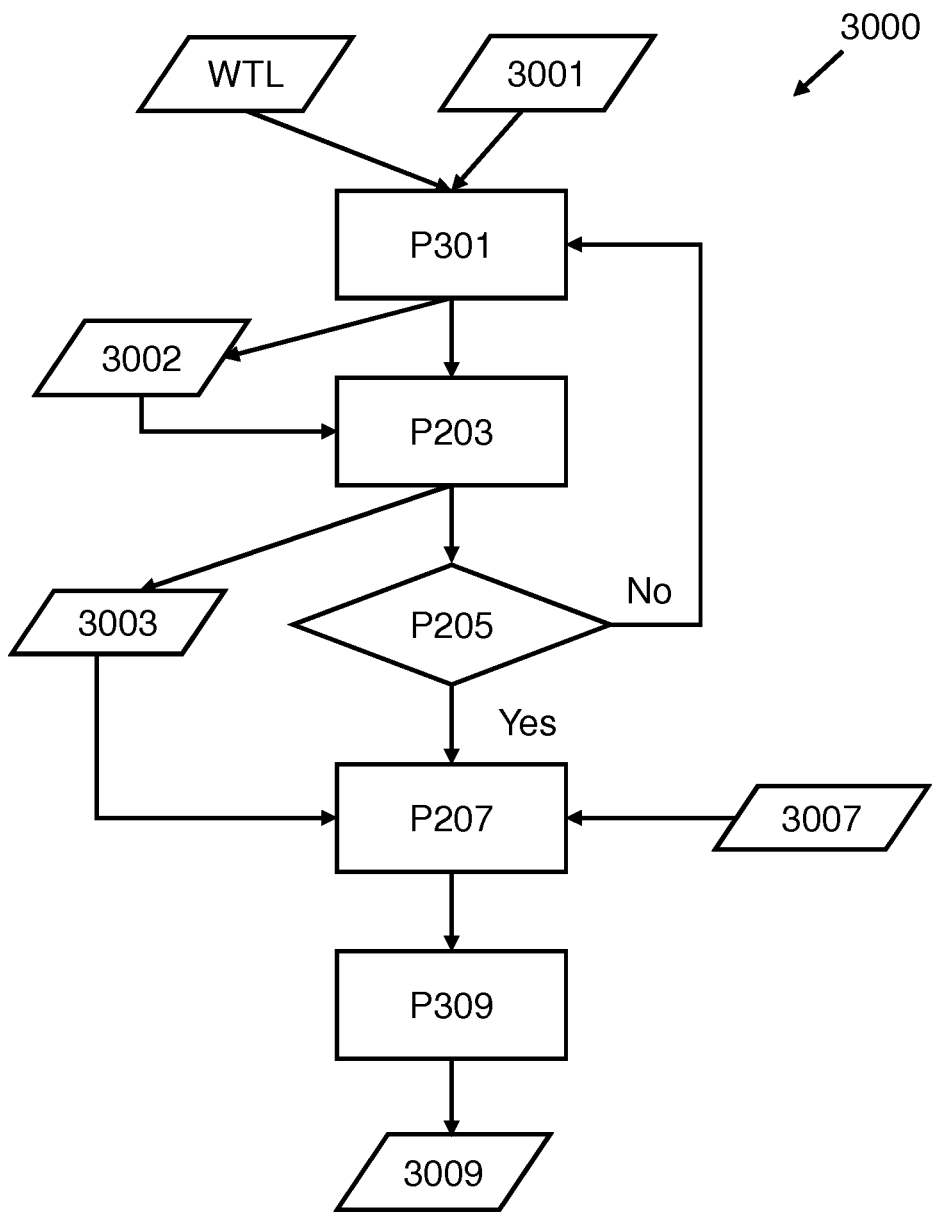
FIG. 3 is a flow chart of a method for training an inverse process model of a patterning process, according to an embodiment.

FIG. 3 is a flow chart of a method 3000 for training, via a processor, (e.g., the processor 104 in FIG. 9) an inverse process model of a patterning process. The method 3000 involves obtaining training set comprising a sample of mask pattern (e.g., in the form of a pixelated image) and measured wafer data corresponding to the mask pattern. The training set may include a portion (also referred as clips) of different patterns extracted from different locations across a full wafer subjected to the patterning process using the sample mask pattern. In an embodiment, multiple such mask patterns and corresponding clips on the printed wafer may be employed for training an inverse process model. In an embodiment, an inverse process model refers to a model configured to predict a patterning device pattern (e.g., a mask pattern) using a wafer target layout or any design layout, in general.

The method 3000 involves obtaining a first patterning device pattern (referred as the first mask pattern hereinafter) from simulation of an inverse lithographic process (e.g., process P301, P203, and P205) that predicts a patterning device pattern based on a wafer target layout (e.g., WLT).

Process P301 is similar to process P201 discussed above. In process P301, part of an inverse lithographic process that involves simulation of one or more process model configured to predict a mask pattern. As mentioned earlier, the simulation of the inverse lithographic process is an iterative process (e.g., processes P301, P203 and P205, as discussed above). In an embodiment, in process P301, involves obtaining an initial mask pattern 3001, which may be similar to the initial mask pattern 2001 discussed above.

Furthermore, the process P301 involves determining, via simulation of the one or more process models, a simulated wafer pattern 3002 on the wafer based on the initial mask pattern 3001. In an embodiment, the process model may be any process model (e.g., a mask model, an optics model, etc.) as discussed in process P201 or a calibrated process model 2009 obtained from the method 2000 above. Accordingly, the simulated wafer pattern 3002 may be similar to 2002 or more accurate than 2002 when calibrated model 2009 is employed in P301.

Further, the method 3000 may include the process P203, as discussed above. For example, as discussed earlier, the process P203 involves evaluating a second cost function, which computes a difference between the simulated wafer pattern 3002 and the wafer target layout WLT. Furthermore, the method 3000 may also include the process P205, discussed above. For example, as discussed above, the process 205 involves a determination of whether the cost function (e.g., contour-based, EPE, CD, etc.) is improved.

Responsive to the value of the second cost function, the process P205 (or alternatively the process P301) involves adjusting the initial mask pattern 3001 such that the second cost function is improved, as discussed earlier. For example, as discussed above, the adjustment refers to modifying the shape and size of a feature within the initial mask pattern 3001 based on a gradient of the second cost function.

The inverse lithographic process determines a first mask pattern 3003, which is further used in the process P207, as discussed earlier. For example, the process P207 involves receiving wafer data 3007 related to a wafer exposed (e.g., via a lithographic apparatus) using the first mask pattern 3003 and further taking measurements to obtain wafer data on the exposed wafer, for example, via a metrology tool (e.g., SEM, YieldStar, etc.). As mentioned earlier, the wafer data includes, but not limited to, measurements related to a feature printed on the wafer including a critical dimension, a contour of the feature, an edge placement error, and/or a process window.

Process P309 involves training an inverse process model configured to predict a second patterning device pattern (referred as a second mask pattern hereinafter) using the wafer data 3007 related to the exposed wafer and the first patterning device pattern 3003. At the end of the training process, the inverse process model becomes a machine learning model configured to predict a patterning device pattern (i.e., the second mask pattern) using a wafer target layout as input. The present disclosure is not limited to any particular machine learning model. The machine learning model can be for example, a neural network, a convolutional neural network (CNN), a Bayesian network, a generalized linear model, a deep learning model or other available machine learning models.

In an embodiment, the machine learning model is a convolutional neural network. The training of CNN-based inverse process model is an iterative process. An iteration includes determining values of model parameters of the CNN based on the wafer data and an input mask pattern, and adjusting the values of the model parameters until a first cost function of the convolutional neural network is improved. For example, the wafer data is used by the CNN to predict the mask pattern and the predicted mask pattern is compared with the input mask pattern (i.e., an inverse mask pattern obtained from inverse lithographic process) in a first cost function as explained below.

In an embodiment, the first cost function is a difference between the patterning device pattern 3003 (e.g., input mask pattern) and a predicted patterning device pattern (e.g., an output of CNN) obtained from the convolutional neural network. In an embodiment, the first cost function may be defined in terms of a contour-based metric, CD, or other suitable geometric or process parameters. The improvement of the first cost function is achieved by modifying the values of the CNN model parameters (e.g., weights, bias, stride, etc.)

For example, the first cost function may be an edge placement error between the mask pattern 3003 (MP) and the predicted mask pattern. The cost function may be expressed as: cost=$f$(MP−CNN(input, cnn_parameter)), where the cost may be EPE (or $EPE^2$ or other appropriate EPE based metric), the function $f$ determines the difference between predicted image (i.e., predicted mask pattern in the form of an image) and the mask pattern (MP), and the input includes wafer data (e.g., SEM image 5020 of FIG. 5C). For example, the function $f$ can first derive contours from a predict image and then calculate the EPE with respect to the mask pattern (MP). The cnn_parameter are optimized parameters determined during the CNN training using gradient based method. In an embodiment, the cnn_parameters may be weights and bias of the CNN. Further, a gradient corresponding to the cost function may be dcost/dparameter, where the parameter may be updated based on equation (e.g., parameter=parameter−learning_rate*gradient). In an embodiment, the parameter may be the weight and/or bias of the machine learning model (e.g., CNN), and learning_rate may be a hyper-parameter used to tune the training process and may be selected by a user or a computer to improve convergence (e.g., faster convergence) of the training process.

The training process of P309 results in a trained inverse process model 3009 that can predict a patterning device pattern (in an embodiment, a final mask pattern) using a wafer target layout as input. In an embodiment, the predicted mask pattern may be a final mask pattern which do not require additional adjustment (e.g., OPC).

Figure 4:
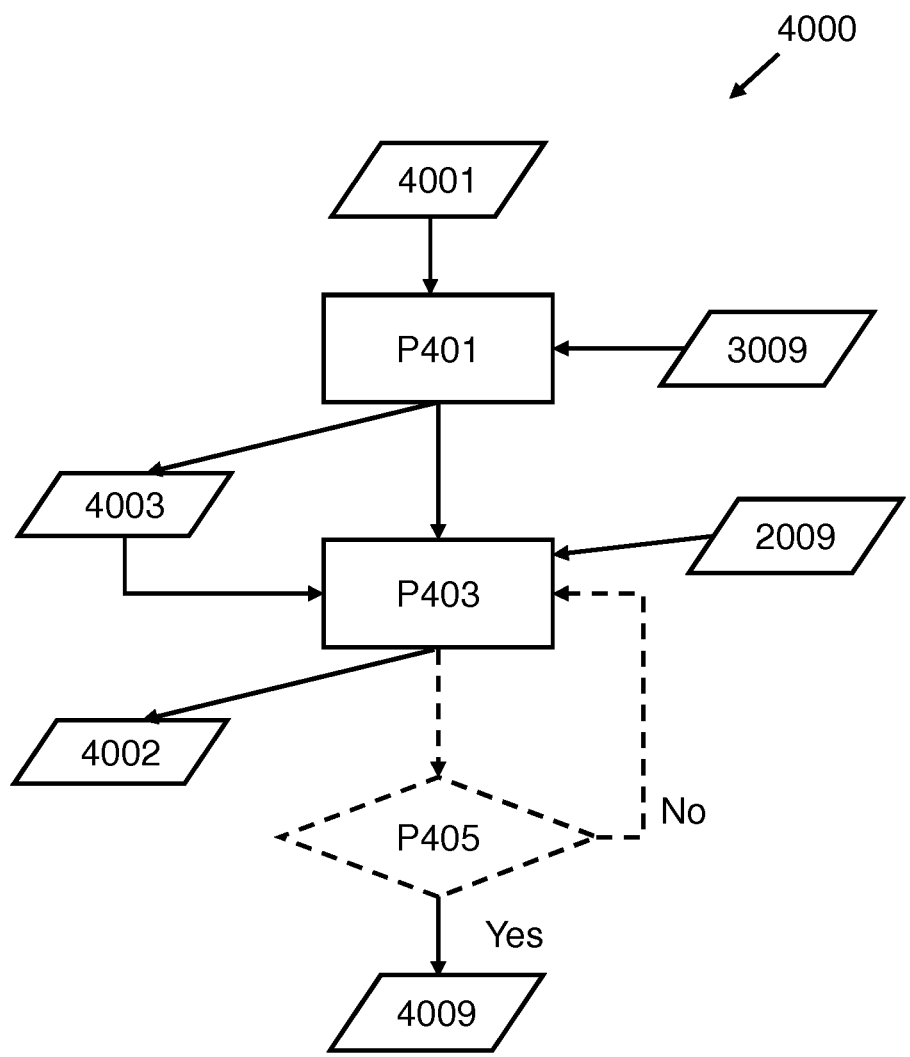
FIG. 4 is a flow chart of a method determining a patterning device layout for a patterning process, according to an embodiment.

FIG. 4 is a flow chart of a method 4000 determining a patterning device layout for a patterning process. The method 4000 employs the trained inverse process model 3009 (e.g., as discussed in method 3000) configured to obtain a mask pattern (e.g., a full mask pattern) corresponding to the wafer target layout (e.g., a design layout). The full mask pattern may be further processed via the calibrated process model 2009 to predict a simulated wafer pattern, which can be compared to the design layout to confirm a quality of the simulated pattern. In an embodiment, the simulated pattern closely resembles the design layout or wafer target layout. According to an embodiment, the mask pattern from the trained model 3009 serves as an excellent starting point and requires minimum modification (or ideally no modification), thus a final full mask pattern may be obtained in low number of iterations (e.g., less than 5, ideally 1 iteration).

In an embodiment, the patterning device layout (e.g., a mask layout) refers to a full mask layout corresponding to full chip (i.e., a die of the wafer), as opposed to a portion of the mask pattern (e.g., hot spot patterns) corresponding a portion of a wafer. However, the method is not limited to a full-chip simulation (i.e., an entire die of the wafer), a person of ordinary skill in the art can understand that the method can be directly employed at clip-level (i.e., a portion of the die) without limiting the scope of the present disclosure.

The method 4000, in process P401 involves executing the trained inverse process model 3009 using a wafer target layout (e.g., a design layout) to obtain an initial (or first) mask pattern 4001. In an embodiment, the initial mask pattern 4001 closely resembles a final mask pattern that includes, for example, final curvilinear features. Thus, in an embodiment, the initial patterning device pattern is a final patterning device layout that does not require adjustment to the initial patterning device pattern.

Further, process P403 involves determining, via simulation of a calibrated process model 2009, a patterning device layout 4009 based on the initial patterning device pattern 4003 and a wafer target layout 4001. As discussed earlier in FIG. 2, the calibrated process model 2009 of the patterning process is calibrated based on wafer data related to the exposed wafer and the patterning device pattern from a simulation of an inverse lithographic process.

In an embodiment, the determining of the patterning device layout 4009 is an iterative process (e.g., iteration of P403 and P405). An iteration involves obtaining the initial patterning device pattern 4003 and determining, via simulation of the calibrated process model 2009, a simulated wafer pattern 4002 on the wafer based on the initial patterning device pattern 4003.

Further, process P405 (similar to process P205 discussed with respect to method 2000) involves evaluating a cost function, which computes a difference between a simulated wafer pattern 4002 and the wafer target layout 4001. As discussed earlier, responsive to the cost function adjustments to the initial mask pattern 4003 may be performed. For example, the process P405 (or P403) may involves adjusting the initial patterning device pattern 4003 such that the cost function is reduced.

In an embodiment, a wafer may be exposed using the full mask pattern 4009 and measurement may be taken on the printed wafer to obtain wafer data. As discussed above, the wafer data may include measurements related to a feature printed on the wafer including a critical dimension, a contour of the feature, an edge placement error, and/or a process window. The measured data may be further used to determine the yield and/or defects of the patterning process.

The above methods have several advantages. For example, the calibrated model 2009 is calibrated using an inverse lithographic process, so the calibrated model 2009 provides better pattern coverage (e.g., accuracy), than convention process model that is calibrated using simple patterns. Since, the calibrated model 2009 is more accurate, when used in inverse lithographic process, convergence is achieved faster compared to a model that is not calibrated with inverse mask from inverse lithographic process.

Furthermore, according to an embodiment, the calibrated model 2009 used in conjunction with the trained inverse process model 3009 may enable full chip simulation (i.e., determining full wafer pattern via simulation as opposed to using a limited number of patterns such as hot spot patterns). In an embodiment, the full mask layout may be obtained in a single iteration of processes in the method 4000. Thus, the methods (e.g., 4000, or 3000 discussed above) can effectively increase pattern coverage to provide improved mask layout at the design stage. In addition, the calibrated model converges to a desired result at a faster rate, thus improving (or reducing) overall simulation time and resource allocation.

Figure 5A:
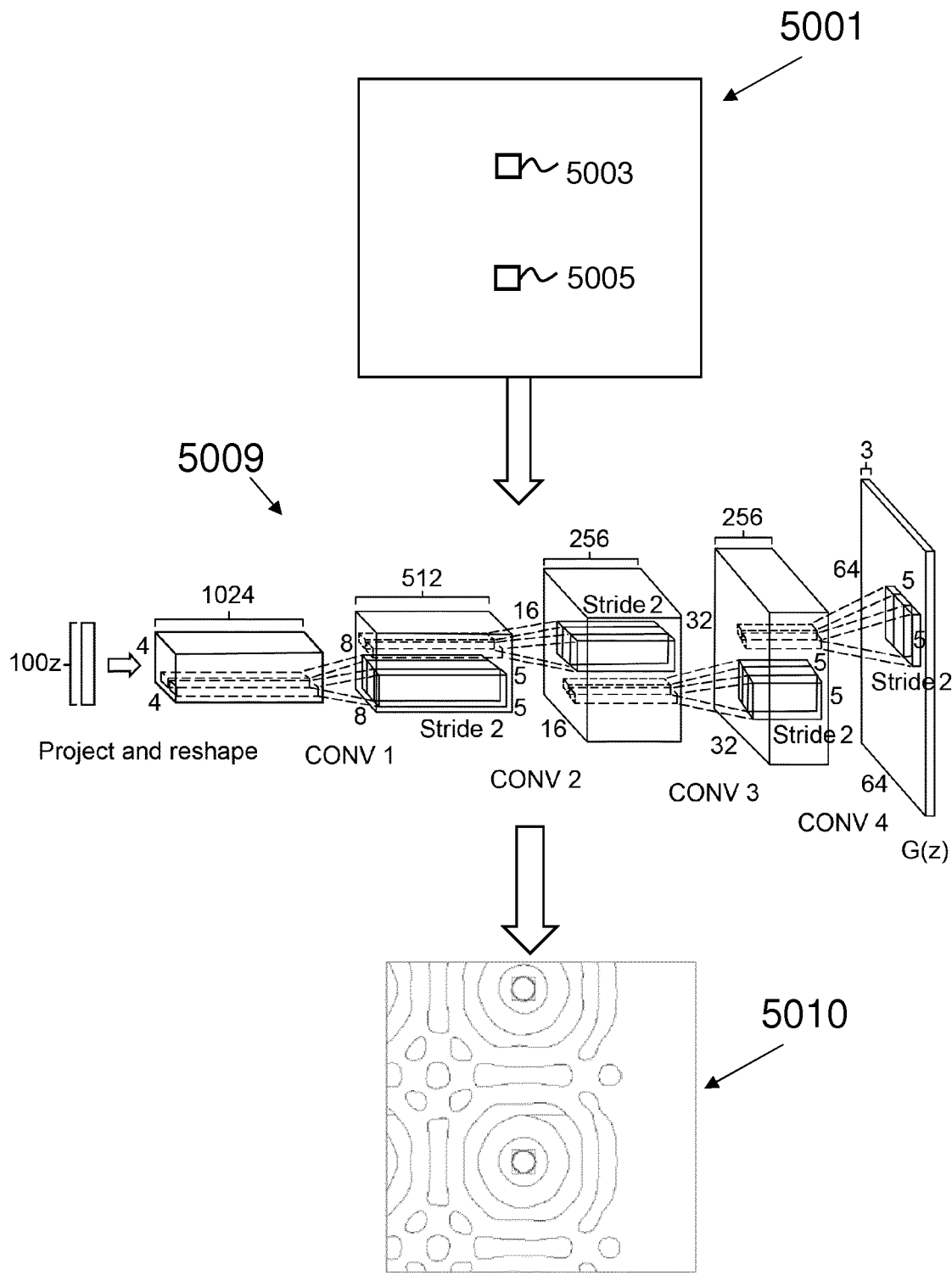
FIG. 5A illustrates an example patterning device pattern generated using an example inverse process model trained as shown in FIG. 3, according to an embodiment.

FIG. 5A illustrates an example patterning device pattern 5009 generated using an example inverse process model trained as shown in FIG. 3. As shown in FIG. 5A, a design target or a wafer target layout 5001 (e.g., including contact holes 5003 and 5005) is provided as input to the convolutional neural network 5009 (an example of the trained process model 3009) resulting in a curvilinear mask pattern 5010. The CNN 5009 includes several layers having unique weights, and/or biases as per the training process of FIG. 3. The input i.e., the wafer target layout 5001 is a pixelated image, each pixel of the pixelated image may be modified according to the convolution operation through each layer to generate the output i.e., the curvilinear mask pattern 5010 at the last layer. Such generation of the curvilinear mask pattern 5010 is a single step process, as opposed to an iterative process of, for example, the conventional inverse OPC process. The curvilinear mask pattern 5010 may be the final mask pattern or may be further modified using the calibrated process model 2009, as discussed in FIG. 4 above.

Figure 5B:
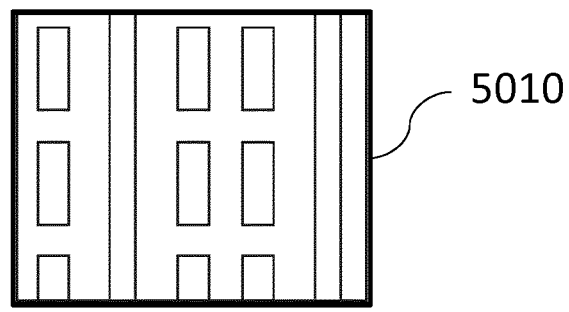
FIG. 5B is an example of a design layout or wafer target layout, according to an embodiment.
Figure 5C:
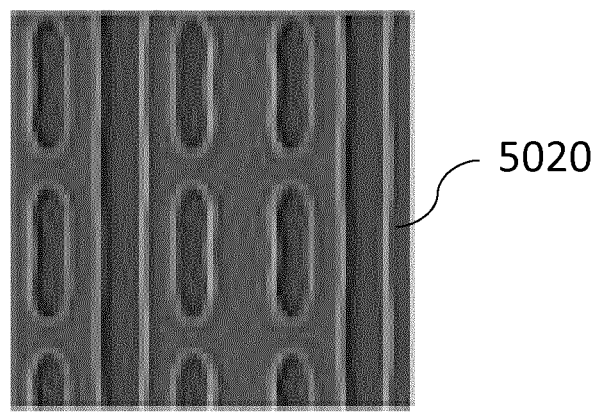
FIG. 5C is an example SEM image of an exposed wafer corresponding to the design layout of FIG. 5B, according to an embodiment.

FIG. 5B is an example of a wafer target layout 5010 (i.e., a design layout) that may be used in the methods discussed above. Using a mask corresponding to the wafer target layout 5010, a wafer may be exposed. FIG. 5C is an example of a SEM image of an exposed wafer 5020 corresponding to the design layout 5010. In an embodiment, wafer data such as contours of the patterns within the SEM image 5020 may be obtained, for example, via image processing.

The above methods and models produced thereof provide several advantages. Firstly, the trained machine learning based inverse lithographic model using wafer data provides accurate results and faster execution compared to traditional models. For example, a traditional iterative mask optimization process includes two sources of errors (1) forward model error, as the process model used in each iteration may not be perfect, and (2) converge error since this high dimensional optimization may not always converge to a global optimal solution. On the other hand, the machine learning based inverse model that is trained directly using wafer data does not have these errors and therefore may be more accurate.

Secondly, the calibrated process model (e.g., a machine learning based model) provides benefits such as (i) a better fitting and accuracy of results and (ii) simpler gradient computation compared to the traditional physics based or empirical models, thus computationally inexpensive compared to computing gradients in a physics based models.

Furthermore, the conventional inverse OPC can only cover the critical portion (e.g., hot spot patterns that are most likely to cause defects on a wafer) of the mask, since one pattern may need a large number of iteration L (e.g., more than 100 iteration) per clip. So, processing millions or even billions of clips for a full-chip is computationally intensive and may be infeasible. As such, accuracy of the mask layout (e.g., developed from a limited number of clips) is affected. In an embodiment, a coverage of less than 10% of the total clips may be achieved. Using a convolutional neural network (e.g., trained inverse process model) can dramatically reduce the iterations from L to M (e.g., less than 20), effectively increasing the number of clips that can be process in an exponential manner. Thus allowing full chip inverse coverage resulting in better accuracy.

According to an embodiment, the methods create the process model 2009 and the inverse process model 3009, when employed together can result in convergence in possibly single step, enabling a fast turnaround time.

According to an embodiment, the output from the above model may be further used in other aspects of the patterning process such as manufacturability. In an embodiment, the final mask pattern may be directly manufactured or the final mask pattern generated by the trained inverse process model may be verified to determine its manufacturability. In an embodiment, manufacturability refers to a constraints imposed by a mask writer to manufacture a mask itself (e.g., with OPC). A mask manufacturing process (e.g., using an e-beam writer) may have limitations that restricts fabrication of certain shapes and/or sizes of a pattern on a mask substrate. In an embodiment, the mask pattern having the Manhattan pattern typically includes straight lines (e.g., modified edges of the target pattern) and SRAFs laid around the target pattern in a vertical or horizontal fashion. Such Manhattan patterns may be relatively easier to manufacture compared to a curvilinear pattern of a curvilinear mask.

As mentioned earlier, the final mask pattern may be a curvilinear mask, which refers to a mask having patterns where the edges of the target pattern are modified during OPC to form curved (e.g., polygon shapes) edges and/or curved SRAFs. Such curvilinear mask may produce more accurate and consistent patterns (compared to Manhattan patterned mask) on the substrate during the patterning process due to a larger process window. However, the curvilinear mask has several manufacturing limitations related to the geometry of the polygons, e.g., radius of curvature, size, curvature of at a corner, etc. that can be fabricated to produce the curvilinear mask. Furthermore, the manufacturing or fabrication process of the curvilinear mask may involve a "Manhattanization" process which may include fracturing or breaking shapes into smaller rectangles and triangles and force fitting the shapes to mimic the curvilinear pattern. Such Manhattanization process may be time intensive, while producing less accurate mask compared to the curvilinear masks. As such, a design-to-mask fabrication time increases, while the accuracy may decrease. Hence, manufacturing limitation of the mask may be considered to improve the accuracy as well as reduce the time from design to manufacture; eventually resulting in an increased yield of patterned substrate during the patterning process.

In an embodiment, the curvilinear mask may be fabricated without the Manhattanization process, using for example, multi beam mask writer; however, the ability to fabricate the curves or polygon shapes may be limited. As such, such manufacturing restriction or violations thereof need to be accounted for during a mask design process to enable fabrication of accurate masks.

Figure 6:
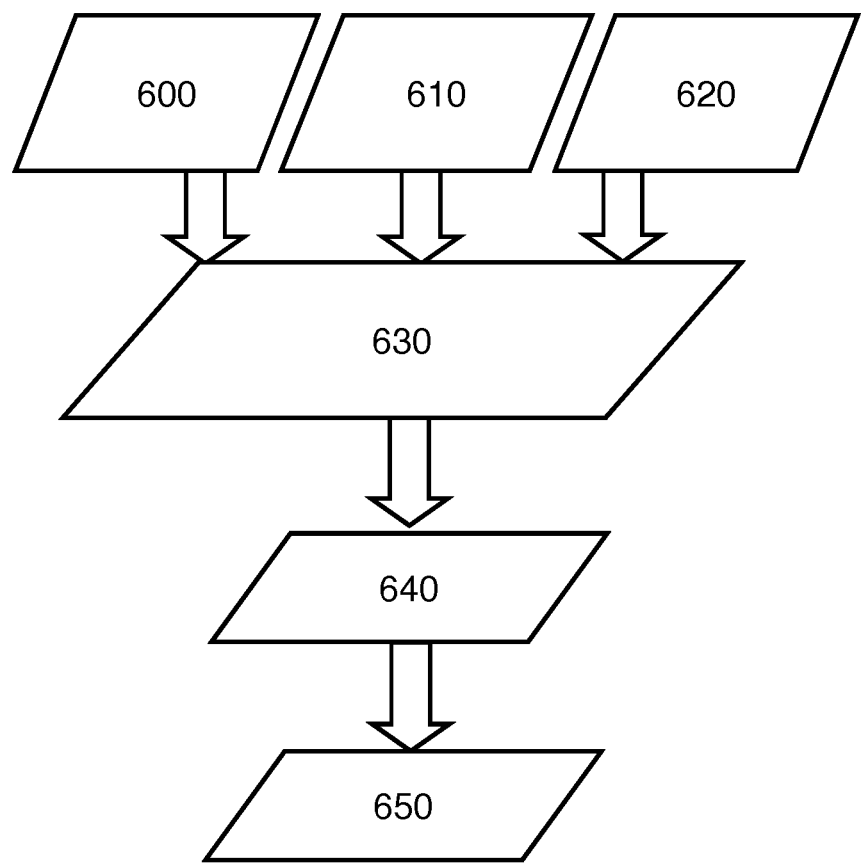
FIG. 6 depicts an example flow chart for modeling and/or simulating at least part of a patterning process, according to an embodiment.

An exemplary flow chart for modeling and/or simulating parts of a patterning process (e.g., lithography in a lithographic apparatus) is illustrated in FIG. 6. As will be appreciated, the models may represent a different patterning process and need not comprise all the models described below. A source model 600 represents optical characteristics (including radiation intensity distribution, bandwidth and/or phase distribution) of the illumination of a patterning device. The source model 600 can represent the optical characteristics of the illumination that include, but not limited to, numerical aperture settings, illumination sigma ($\sigma$) settings as well as any particular illumination shape (e.g. off-axis radiation shape such as annular, quadrupole, dipole, etc.), where $\sigma$ (or sigma) is outer radial extent of the illuminator.

A projection optics model 610 represents optical characteristics (including changes to the radiation intensity distribution and/or the phase distribution caused by the projection optics) of the projection optics. The projection optics model 610 can represent the optical characteristics of the projection optics, including aberration, distortion, one or more refractive indexes, one or more physical sizes, one or more physical dimensions, etc.

The patterning device model module 120 captures how the design features are laid out in the pattern of the patterning device and may include a representation of detailed physical properties of the patterning device, as described, for example, in U.S. Pat. No. 7,587,704. The objective of the simulation is to accurately predict, for example, edge placements and CDs, which can then be compared against the device design. The device design is generally defined as the pre-OPC patterning device layout, and will be provided in a standardized digital file format such as GDSII or OASIS.

A design layout model 620 represents optical characteristics (including changes to the radiation intensity distribution and/or the phase distribution caused by a given design layout) of a design layout (e.g., a device design layout corresponding to a feature of an integrated circuit, a memory, an electronic device, etc.), which is the representation of an arrangement of features on or formed by the patterning device. The design layout model 620 can represent one or more physical properties of a physical patterning device, as described, for example, in U.S. Pat. No. 7,587,704, which is incorporated by reference in its entirety. Since the patterning device used in the lithographic projection apparatus can be changed, it is desirable to separate the optical properties of the patterning device from the optical properties of the rest of the lithographic projection apparatus including at least the illumination and the projection optics.

An aerial image 630 can be simulated from the source model 600, the projection optics model 610 and the design layout model 620. An aerial image (AI) is the radiation intensity distribution at substrate level. Optical properties of the lithographic projection apparatus (e.g., properties of the illumination, the patterning device and the projection optics) dictate the aerial image.

A resist layer on a substrate is exposed by the aerial image and the aerial image is transferred to the resist layer as a latent "resist image" (RI) therein. The resist image (RI) can be defined as a spatial distribution of solubility of the resist in the resist layer. A resist image 650 can be simulated from the aerial image 630 using a resist model 640. The resist model can be used to calculate the resist image from the aerial image, an example of which can be found in U.S. Patent Application Publication No. US 2009-0157360, the disclosure of which is hereby incorporated by reference in its entirety. The resist model typically describes the effects of chemical processes which occur during resist exposure, post exposure bake (PEB) and development, in order to predict, for example, contours of resist features formed on the substrate and so it typically related only to such properties of the resist layer (e.g., effects of chemical processes which occur during exposure, post-exposure bake and development). In an embodiment, the optical properties of the resist layer, e.g., refractive index, film thickness, propagation and polarization effects—may be captured as part of the projection optics model 610.

So, in general, the connection between the optical and the resist model is a simulated aerial image intensity within the resist layer, which arises from the projection of radiation onto the substrate, refraction at the resist interface and multiple reflections in the resist film stack. The radiation intensity distribution (aerial image intensity) is turned into a latent "resist image" by absorption of incident energy, which is further modified by diffusion processes and various loading effects. Efficient simulation methods that are fast enough for full-chip applications approximate the realistic 3-dimensional intensity distribution in the resist stack by a 2-dimensional aerial (and resist) image.

In an embodiment, the resist image can be used an input to a post-pattern transfer process model module 150. The post-pattern transfer process model 150 defines performance of one or more post-resist development processes (e.g., etch, development, etc.).

Simulation of the patterning process can, for example, predict contours, CDs, edge placement (e.g., edge placement error), etc. in the resist and/or etched image. Thus, the objective of the simulation is to accurately predict, for example, edge placement, and/or aerial image intensity slope, and/or CD, etc. of the printed pattern. These values can be compared against an intended design to, e.g., correct the patterning process, identify where a defect is predicted to occur, etc. The intended design is generally defined as a pre-OPC design layout which can be provided in a standardized digital file format such as GDSII or OASIS or other file format.

Thus, the model formulation describes most, if not all, of the known physics and chemistry of the overall process, and each of the model parameters desirably corresponds to a distinct physical or chemical effect. The model formulation thus sets an upper bound on how well the model can be used to simulate the overall manufacturing process.

Inspection of, e.g., semiconductor wafers is often done with optics-based sub-resolution tools (bright-field inspection). But, in some cases, certain features to be measured are too small to be effectively measured using bright-field inspection. For example, bright-field inspection of defects in features of a semiconductor device can be challenging. Moreover, as time progresses, features that are being made using patterning processes (e.g., semiconductor features made using lithography) are becoming smaller and in many cases, the density of features is also increasing. Accordingly, a higher resolution inspection technique is used and desired. An example inspection technique is electron beam inspection. Electron beam inspection involves focusing a beam of electrons on a small spot on the substrate to be inspected. An image is formed by providing relative movement between the beam and the substrate (hereinafter referred to as scanning the electron beam) over the area of the substrate inspected and collecting secondary and/or backscattered electrons with an electron detector. The image data is then processed to, for example, identify defects.

So, in an embodiment, the inspection apparatus may be an electron beam inspection apparatus (e.g., the same as or similar to a scanning electron microscope (SEM)) that yields an image of a structure (e.g., some or all the structure of a device, such as an integrated circuit) exposed or transferred on the substrate.

Figure 7:
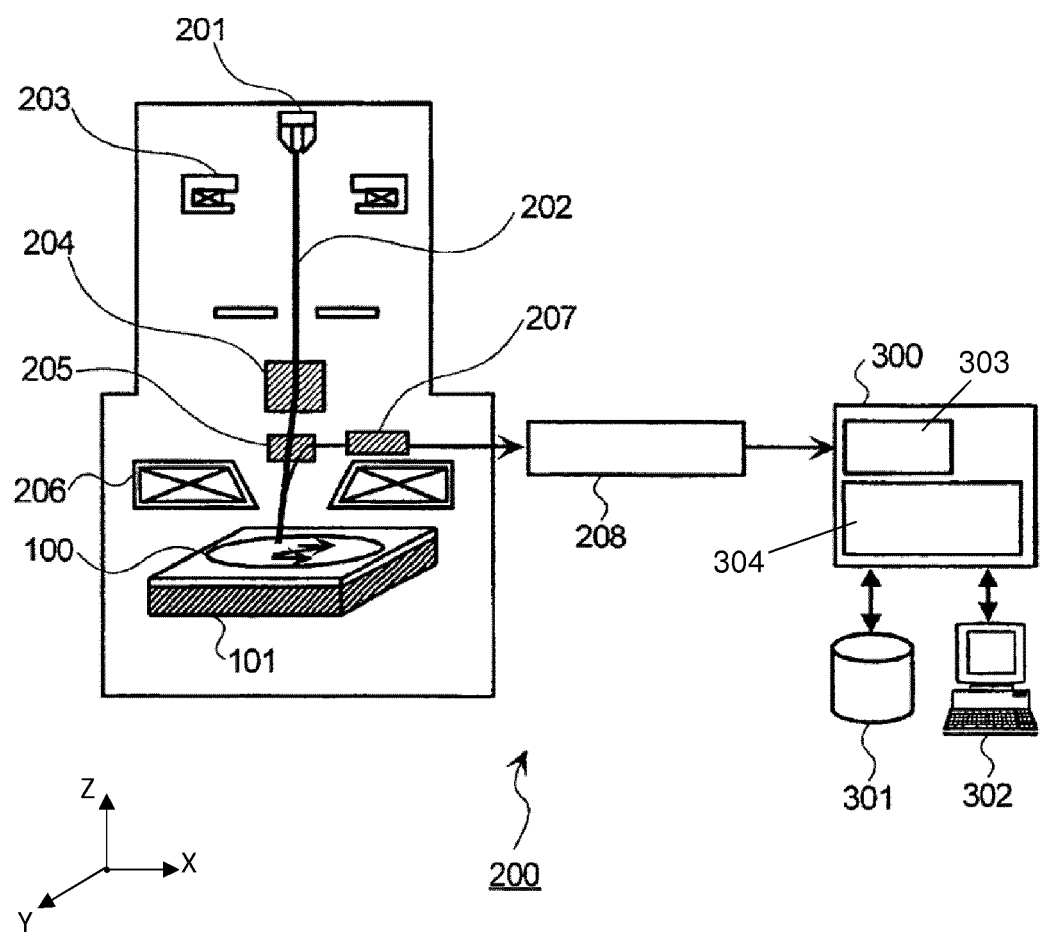
FIG. 7 schematically depicts an embodiment of a scanning electron microscope (SEM), according to an embodiment.

FIG. 7 schematically depicts an embodiment of an electron beam inspection apparatus 200. A primary electron beam 202 emitted from an electron source 201 is converged by condenser lens 203 and then passes through a beam deflector 204, an E×B deflector 205, and an objective lens 206 to irradiate a substrate 100 on a substrate table 101 at a focus.

When the substrate 100 is irradiated with electron beam 202, secondary electrons are generated from the substrate 100. The secondary electrons are deflected by the E×B deflector 205 and detected by a secondary electron detector 207. A two-dimensional electron beam image can be obtained by detecting the electrons generated from the sample in synchronization with, e.g., two dimensional scanning of the electron beam by beam deflector 204 or with repetitive scanning of electron beam 202 by beam deflector 204 in an X or Y direction, together with continuous movement of the substrate 100 by the substrate table 101 in the other of the X or Y direction. Thus, in an embodiment, the electron beam inspection apparatus has a field of view for the electron beam defined by the angular range into which the electron beam can be provided by the electron beam inspection apparatus (e.g., the angular range through which the deflector 204 can provide the electron beam 202). Thus, the spatial extent of the field of the view is the spatial extent to which the angular range of the electron beam can impinge on a surface (wherein the surface can be stationary or can move with respect to the field).

A signal detected by secondary electron detector 207 is converted to a digital signal by an analog/digital (A/D) converter 208, and the digital signal is sent to an image processing system 300. In an embodiment, the image processing system 300 may have memory 303 to store all or part of digital images for processing by a processing unit 304. The processing unit 304 (e.g., specially designed hardware or a combination of hardware and software or a computer readable medium comprising software) is configured to convert or process the digital images into datasets representative of the digital images. In an embodiment, the processing unit 304 is configured or programmed to cause execution of a method described herein. Further, image processing system 300 may have a storage medium 301 configured to store the digital images and corresponding datasets in a reference database. A display device 302 may be connected with the image processing system 300, so that an operator can conduct necessary operation of the equipment with the help of a graphical user interface.

FIG. 8 schematically illustrates a further embodiment of an inspection apparatus. The system is used to inspect a sample 90 (such as a substrate) on a sample stage 88 and comprises a charged particle beam generator 81, a condenser lens module 82, a probe forming objective lens module 83, a charged particle beam deflection module 84, a secondary charged particle detector module 85, and an image forming module 86.

The charged particle beam generator 81 generates a primary charged particle beam 91. The condenser lens module 82 condenses the generated primary charged particle beam 91. The probe forming objective lens module 83 focuses the condensed primary charged particle beam into a charged particle beam probe 92. The charged particle beam deflection module 84 scans the formed charged particle beam probe 92 across the surface of an area of interest on the sample 90 secured on the sample stage 88. In an embodiment, the charged particle beam generator 81, the condenser lens module 82 and the probe forming objective lens module 83, or their equivalent designs, alternatives or any combination thereof, together form a charged particle beam probe generator which generates the scanning charged particle beam probe 92.

The secondary charged particle detector module 85 detects secondary charged particles 93 emitted from the sample surface (maybe also along with other reflected or scattered charged particles from the sample surface) upon being bombarded by the charged particle beam probe 92 to generate a secondary charged particle detection signal 94. The image forming module 86 (e.g., a computing device) is coupled with the secondary charged particle detector module 85 to receive the secondary charged particle detection signal 94 from the secondary charged particle detector module 85 and accordingly forming at least one scanned image. In an embodiment, the secondary charged particle detector module 85 and image forming module 86, or their equivalent designs, alternatives or any combination thereof, together form an image forming apparatus which forms a scanned image from detected secondary charged particles emitted from sample 90 being bombarded by the charged particle beam probe 92.

In an embodiment, a monitoring module 87 is coupled to the image forming module 86 of the image forming apparatus to monitor, control, etc. the patterning process and/or derive a parameter for patterning process design, control, monitoring, etc. using the scanned image of the sample 90 received from image forming module 86. So, in an embodiment, the monitoring module 87 is configured or programmed to cause execution of a method described herein. In an embodiment, the monitoring module 87 comprises a computing device. In an embodiment, the monitoring module 87 comprises a computer program to provide functionality herein and encoded on a computer readable medium forming, or disposed within, the monitoring module 87.

In an embodiment, like the electron beam inspection tool of FIG. 7 that uses a probe to inspect a substrate, the electron current in the system of FIG. 8 is significantly larger compared to, e.g., a CD SEM such as depicted in FIG. 7, such that the probe spot is large enough so that the inspection speed can be fast. However, the resolution may not be as high as compared to a CD SEM because of the large probe spot. In an embodiment, the above discussed inspection apparatus (in FIGS. 7 and 8) may be single beam or a multi-beam apparatus without limiting the scope of the present disclosure.

The SEM images, from, e.g., the system of FIG. 7 and/or FIG. 8, may be processed to extract contours that describe the edges of objects, representing device structures, in the image. These contours are then typically quantified via metrics, such as CD, at user-defined cut-lines. Thus, typically, the images of device structures are compared and quantified via metrics, such as an edge-to-edge distance (CD) measured on extracted contours or simple pixel differences between images.

Now, besides measuring substrates in a patterning process, it is often desirable to use one or more tools to produce results that, for example, can be used to design, control, monitor, etc. the patterning process. To do this, there may be provided one or more tools used in computationally controlling, designing, etc. one or more aspects of the patterning process, such as the pattern design for a patterning device (including, for example, adding sub-resolution assist features or optical proximity corrections), the illumination for the patterning device, etc. Accordingly, in a system for computationally controlling, designing, etc. a manufacturing process involving patterning, the major manufacturing system components and/or processes can be described by various functional modules. In particular, in an embodiment, one or more mathematical models can be provided that describe one or more steps and/or apparatuses of the patterning process, including typically the pattern transfer step. In an embodiment, a simulation of the patterning process can be performed using one or more mathematical models to simulate how the patterning process forms a patterned substrate using a measured or design pattern provided by a patterning device.

FIG. 9 is a block diagram that illustrates a computer system 100 which can assist in implementing the methods, flows or the apparatus disclosed herein. Computer system 100 includes a bus 102 or other communication mechanism for communicating information, and a processor 104 (or multiple processors 104 and 105) coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device.

According to one embodiment, portions of one or more methods described herein may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In an alternative embodiment, hard-wired circuitry may be used in place of or in combination with software instructions. Thus, the description herein is not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 may also include a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. One such downloaded application may provide all or part of a method described herein, for example. The received code may be executed by processor 104 as it is received, and/or stored in storage device 110, or other non-volatile storage for later execution. In this manner, computer system 100 may obtain application code in the form of a carrier wave.

Figure 10:
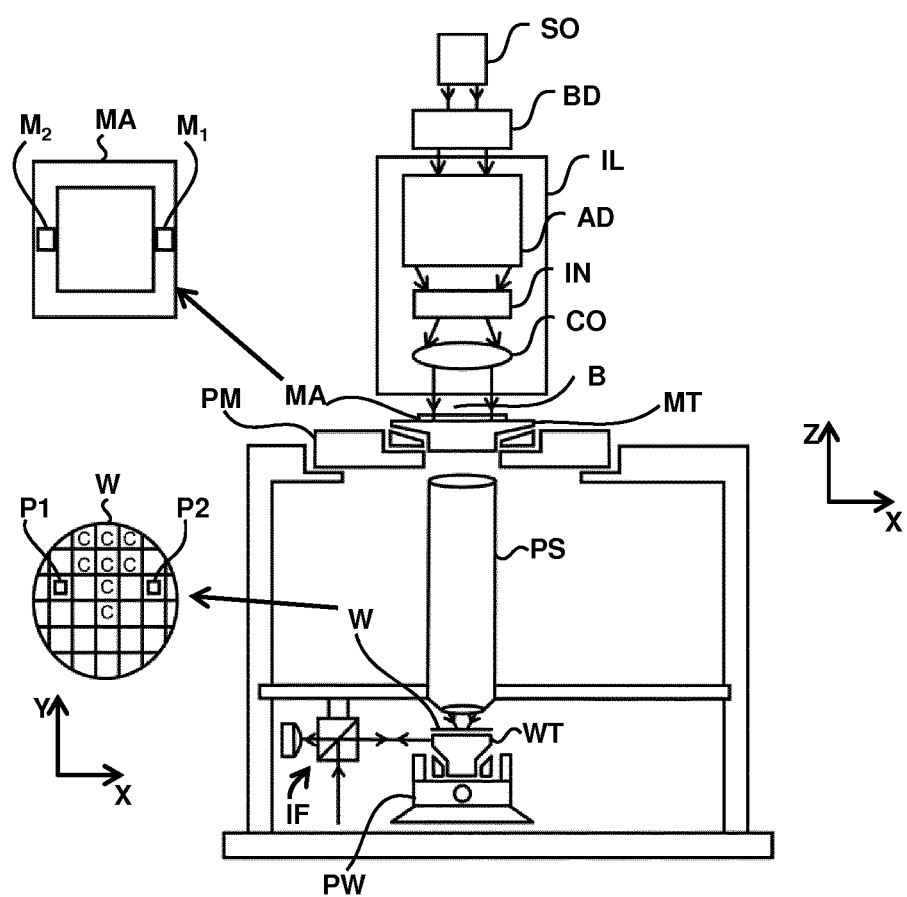
FIG. 10 is a schematic diagram of a lithographic projection apparatus, according to an embodiment.

FIG. 10 schematically depicts an exemplary lithographic projection apparatus in conjunction with the techniques described herein can be utilized. The apparatus comprises:

- an illumination system IL, to condition a beam B of radiation. In this particular case, the illumination system also comprises a radiation source SO;
- a first object table (e.g., patterning device table) MT provided with a patterning device holder to hold a patterning device MA (e.g., a reticle), and connected to a first positioner to accurately position the patterning device with respect to item PS;
- a second object table (substrate table) WT provided with a substrate holder to hold a substrate W (e.g., a resist-coated silicon wafer), and connected to a second positioner to accurately position the substrate with respect to item PS;
- a projection system ("lens") PS (e.g., a refractive, catoptric or catadioptric optical system) to image an irradiated portion of the patterning device MA onto a target portion C (e.g., comprising one or more dies) of the substrate W.

As depicted herein, the apparatus is of a transmissive type (i.e., has a transmissive patterning device). However, in general, it may also be of a reflective type, for example (with a reflective patterning device). The apparatus may employ a different kind of patterning device to classic mask; examples include a programmable mirror array or LCD matrix.

The source SO (e.g., a mercury lamp or excimer laser, LPP (laser produced plasma) EUV source) produces a beam of radiation. This beam is fed into an illumination system (illuminator) IL, either directly or after having traversed conditioning means, such as a beam expander Ex, for example. The illuminator IL may comprise adjusting means AD for setting the outer and/or inner radial extent (commonly referred to as σ-outer and σ-inner, respectively) of the intensity distribution in the beam. In addition, it will generally comprise various other components, such as an integrator IN and a condenser CO. In this way, the beam B impinging on the patterning device MA has a desired uniformity and intensity distribution in its cross-section.

It should be noted with regard to FIG. 10 that the source SO may be within the housing of the lithographic projection apparatus (as is often the case when the source SO is a mercury lamp, for example), but that it may also be remote from the lithographic projection apparatus, the radiation beam that it produces being led into the apparatus (e.g., with the aid of suitable directing mirrors); this latter scenario is often the case when the source SO is an excimer laser (e.g., based on KrF, ArF or $F_2$ lasing).

The beam PB subsequently intercepts the patterning device MA, which is held on a patterning device table MT. Having traversed the patterning device MA, the beam B passes through the lens PL, which focuses the beam B onto a target portion C of the substrate W. With the aid of the second positioning means (and interferometric measuring means IF), the substrate table WT can be moved accurately, e.g. so as to position different target portions C in the path of the beam PB. Similarly, the first positioning means can be used to accurately position the patterning device MA with respect to the path of the beam B, e.g., after mechanical retrieval of the patterning device MA from a patterning device library, or during a scan. In general, movement of the object tables MT, WT will be realized with the aid of a long-stroke module (coarse positioning) and a short-stroke module (fine positioning), which are not explicitly depicted in FIG. 10. However, in the case of a stepper (as opposed to a step-and-scan tool) the patterning device table MT may just be connected to a short stroke actuator, or may be fixed.

The depicted tool can be used in two different modes:

In step mode, the patterning device table MT is kept essentially stationary, and an entire patterning device image is projected in one go (i.e., a single "flash") onto a target portion C. The substrate table WT is then shifted in the x and/or y directions so that a different target portion C can be irradiated by the beam PB;

In scan mode, essentially the same scenario applies, except that a given target portion C is not exposed in a single "flash". Instead, the patterning device table MT is movable in a given direction (the so-called "scan direction", e.g., the y direction) with a speed v, so that the projection beam B is caused to scan over a patterning device image; concurrently, the substrate table WT is simultaneously moved in the same or opposite direction at a speed V=Mv, in which M is the magnification of the lens PL (typically, M=¼ or ⅕). In this manner, a relatively large target portion C can be exposed, without having to compromise on resolution.

Figure 11:
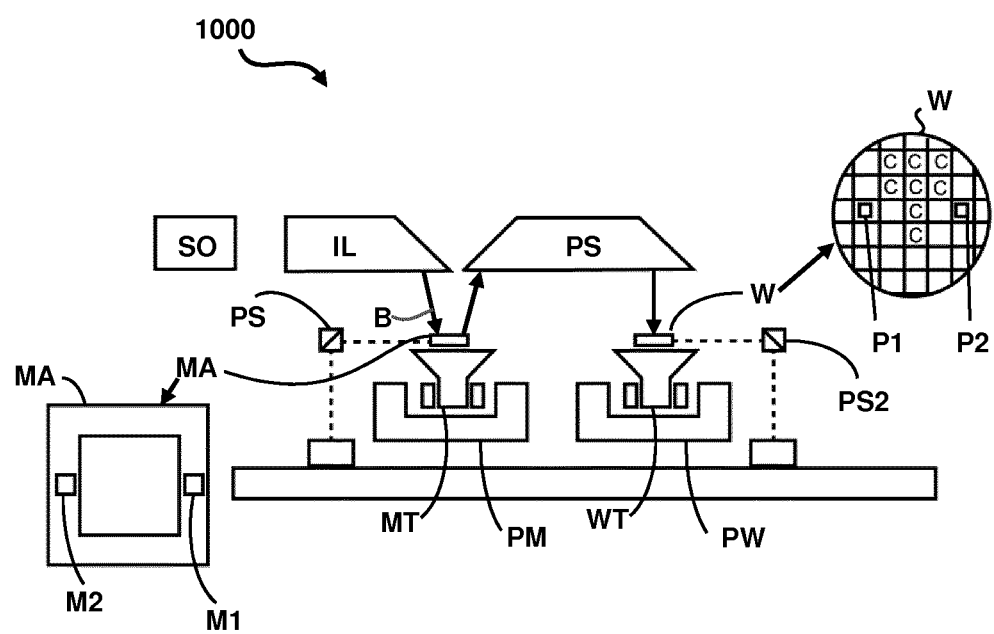
FIG. 11 is a schematic diagram of another lithographic projection apparatus, according to an embodiment.

FIG. 11 schematically depicts another exemplary lithographic projection apparatus 1000 in conjunction with the techniques described herein can be utilized.

The lithographic projection apparatus 1000 comprises:

a source collector module SO an illumination system (illuminator) IL configured to condition a radiation beam B (e.g. EUV radiation).

a support structure (e.g. a patterning device table) MT constructed to support a patterning device (e.g. a mask or a reticle) MA and connected to a first positioner PM configured to accurately position the patterning device;

a substrate table (e.g. a wafer table) WT constructed to hold a substrate (e.g. a resist coated wafer) W and connected to a second positioner PW configured to accurately position the substrate; and a projection system (e.g. a reflective projection system) PS configured to project a pattern imparted to the radiation beam B by patterning device MA onto a target portion C (e.g. comprising one or more dies) of the substrate W.

As here depicted, the apparatus 1000 is of a reflective type (e.g. employing a reflective patterning device). It is to be noted that because most materials are absorptive within the EUV wavelength range, the patterning device may have multilayer reflectors comprising, for example, a multi-stack of Molybdenum and Silicon. In one example, the multi-stack reflector has a 40 layer pairs of Molybdenum and Silicon where the thickness of each layer is a quarter wavelength. Even smaller wavelengths may be produced with X-ray lithography. Since most material is absorptive at EUV and x-ray wavelengths, a thin piece of patterned absorbing material on the patterning device topography (e.g., a TaN absorber on top of the multi-layer reflector) defines where features would print (positive resist) or not print (negative resist).

Referring to FIG. 11, the illuminator IL receives an extreme ultra violet radiation beam from the source collector module SO. Methods to produce EUV radiation include, but are not necessarily limited to, converting a material into a plasma state that has at least one element, e.g., xenon, lithium or tin, with one or more emission lines in the EUV range. In one such method, often termed laser produced plasma ("LPP") the plasma can be produced by irradiating a fuel, such as a droplet, stream or cluster of material having the line-emitting element, with a laser beam. The source collector module SO may be part of an EUV radiation system including a laser, not shown in FIG. 11, for providing the laser beam exciting the fuel. The resulting plasma emits output radiation, e.g., EUV radiation, which is collected using a radiation collector, disposed in the source collector module. The laser and the source collector module may be separate entities, for example when a CO2 laser is used to provide the laser beam for fuel excitation.

In such cases, the laser is not considered to form part of the lithographic apparatus and the radiation beam is passed from the laser to the source collector module with the aid of a beam delivery system comprising, for example, suitable directing mirrors and/or a beam expander. In other cases the source may be an integral part of the source collector module, for example when the source is a discharge produced plasma EUV generator, often termed as a DPP source.

The illuminator IL may comprise an adjuster for adjusting the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL may comprise various other components, such as facetted field and pupil mirror devices. The illuminator may be used to condition the radiation beam, to have a desired uniformity and intensity distribution in its cross section.

The radiation beam B is incident on the patterning device (e.g., mask) MA, which is held on the support structure (e.g., patterning device table) MT, and is patterned by the patterning device. After being reflected from the patterning device (e.g. mask) MA, the radiation beam B passes through the projection system PS, which focuses the beam onto a target portion C of the substrate W. With the aid of the second positioner PW and position sensor PS2 (e.g. an interferometric device, linear encoder or capacitive sensor), the substrate table WT can be moved accurately, e.g. so as to position different target portions C in the path of the radiation beam B. Similarly, the first positioner PM and another position sensor PS1 can be used to accurately position the patterning device (e.g. mask) MA with respect to the path of the radiation beam B. Patterning device (e.g. mask) MA and substrate W may be aligned using patterning device alignment marks M1, M2 and substrate alignment marks P1, P2.

The depicted apparatus 1000 could be used in at least one of the following modes:

1. In step mode, the support structure (e.g. patterning device table) MT and the substrate table WT are kept essentially stationary, while an entire pattern imparted to the radiation beam is projected onto a target portion C at one time (i.e. a single static exposure). The substrate table WT is then shifted in the X and/or Y direction so that a different target portion C can be exposed.

2. In scan mode, the support structure (e.g. patterning device table) MT and the substrate table WT are scanned synchronously while a pattern imparted to the radiation beam is projected onto a target portion C (i.e. a single dynamic exposure). The velocity and direction of the substrate table WT relative to the support structure (e.g. patterning device table) MT may be determined by the (de-) magnification and image reversal characteristics of the projection system PS.

3. In another mode, the support structure (e.g. patterning device table) MT is kept essentially stationary holding a programmable patterning device, and the substrate table WT is moved or scanned while a pattern imparted to the radiation beam is projected onto a target portion C. In this mode, generally a pulsed radiation source is employed and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Figure 12:
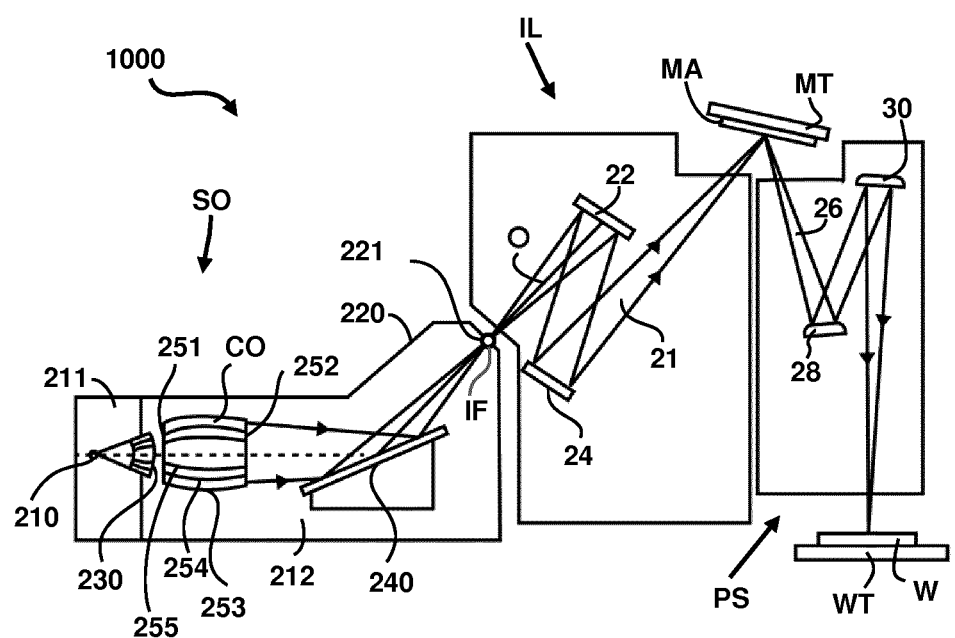
FIG. 12 is a more detailed view of the apparatus in FIG. 10, according to an embodiment.

FIG. 12 shows the apparatus 1000 in more detail, including the source collector module SO, the illumination system IL, and the projection system PS. The source collector module SO is constructed and arranged such that a vacuum environment can be maintained in an enclosing structure 220 of the source collector module SO. An EUV radiation emitting plasma 210 may be formed by a discharge produced plasma source. EUV radiation may be produced by a gas or vapor, for example Xe gas, Li vapor or Sn vapor in which the very hot plasma 210 is created to emit radiation in the EUV range of the electromagnetic spectrum. The very hot plasma 210 is created by, for example, an electrical discharge causing at least partially ionized plasma. Partial pressures of, for example, 10 Pa of Xe, Li, Sn vapor or any other suitable gas or vapor may be required for efficient generation of the radiation. In an embodiment, a plasma of excited tin (Sn) is provided to produce EUV radiation.

The radiation emitted by the hot plasma 210 is passed from a source chamber 211 into a collector chamber 212 via an optional gas barrier or contaminant trap 230 (in some cases also referred to as contaminant barrier or foil trap) which is positioned in or behind an opening in source chamber 211. The contaminant trap 230 may include a channel structure. Contamination trap 230 may also include a gas barrier or a combination of a gas barrier and a channel structure. The contaminant trap or contaminant barrier 230 further indicated herein at least includes a channel structure, as known in the art.

The collector chamber 211 may include a radiation collector CO which may be a so-called grazing incidence collector. Radiation collector CO has an upstream radiation collector side 251 and a downstream radiation collector side 252. Radiation that traverses collector CO can be reflected off a grating spectral filter 240 to be focused in a virtual source point IF along the optical axis indicated by the dot-dashed line 'O'. The virtual source point IF is commonly referred to as the intermediate focus, and the source collector module is arranged such that the intermediate focus IF is located at or near an opening 221 in the enclosing structure 220. The virtual source point IF is an image of the radiation emitting plasma 210.

Subsequently the radiation traverses the illumination system IL, which may include a facetted field mirror device 22 and a facetted pupil mirror device 24 arranged to provide a desired angular distribution of the radiation beam 21, at the patterning device MA, as well as a desired uniformity of radiation intensity at the patterning device MA. Upon reflection of the beam of radiation 21 at the patterning device MA, held by the support structure MT, a patterned beam 26 is formed and the patterned beam 26 is imaged by the projection system PS via reflective elements 28, 30 onto a substrate W held by the substrate table WT.

More elements than shown may generally be present in illumination optics unit IL and projection system PS. The grating spectral filter 240 may be optionally be present, depending upon the type of lithographic apparatus. Further, there may be more mirrors present than those shown in the figures, for example there may be 1-6 additional reflective elements present in the projection system PS than shown in FIG. 12.

Collector optic CO, as illustrated in FIG. 12, is depicted as a nested collector with grazing incidence reflectors 253, 254 and 255, just as an example of a collector (or collector mirror). The grazing incidence reflectors 253, 254 and 255 are disposed axially symmetric around the optical axis O and a collector optic CO of this type may be used in combination with a discharge produced plasma source, often called a DPP source.

Figure 13:
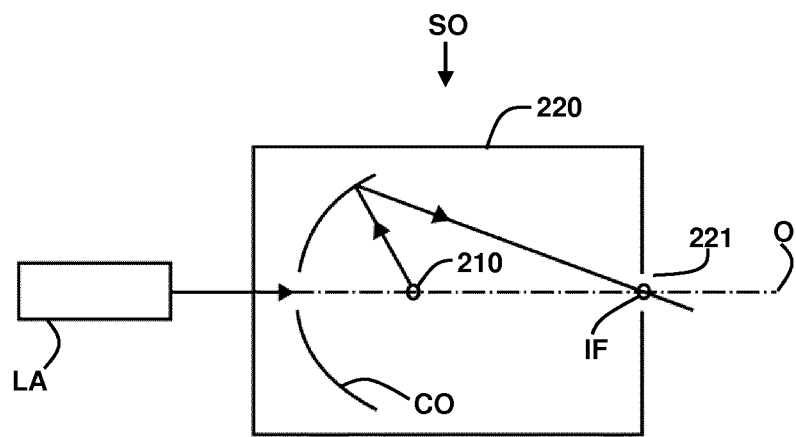
FIG. 13 is a more detailed view of the source collector module SO of the apparatus of FIG. 11 and FIG. 12, according to an embodiment.

Alternatively, the source collector module SO may be part of an LPP radiation system as shown in FIG. 13. A laser LA is arranged to deposit laser energy into a fuel, such as xenon (Xe), tin (Sn) or lithium (Li), creating the highly ionized plasma 210 with electron temperatures of several 10's of eV. The energetic radiation generated during de-excitation and recombination of these ions is emitted from the plasma, collected by a near normal incidence collector optic CO and focused onto the opening 221 in the enclosing structure 220.

The embodiments may further be described using the following clauses:

1. A method for calibrating a process model of a patterning process, the method comprising:

obtaining a patterning device pattern from simulation of an inverse lithographic process that predicts the patterning device pattern based on a wafer target layout;

receiving, via a processor, wafer data corresponding to a wafer exposed using the patterning device pattern; and calibrating, via the processor, a process model of the patterning process based on the wafer data related to the exposed wafer and the patterning device pattern.

2. The method of clause 1, wherein the calibrating the process model is an iterative process, an iteration comprising:

determining values of model parameters of the process model based on the wafer data and the patterning device pattern; and adjusting the values of the model parameters until a first cost function of the process model is improved.

3. The method of clause 2, wherein the first cost function is a difference between the wafer data and a predicted pattern obtained from the calibrated process model.

4. The method of clause 3, wherein the difference is measured in terms of a performance parameter of the patterning process including at least one of a contour of a feature, critical dimension, and/or a process window.

5. The method of any of clauses 1-4, wherein the simulation of the inverse lithographic process involves simulation of:
a mask model configured to predict a mask image from the patterning device pattern;
an optical model configured to predict an aerial image corresponding to the patterning device pattern,
a resist model configured to predict a resist image corresponding to the patterning device pattern; and/or
an etch model configured to predict an etch image corresponding to the patterning device pattern.

6. The method of any of clauses 1-5, wherein the simulation of the inverse lithographic process is an iterative process, an iteration comprises:

obtaining an initial patterning device pattern;

determining, via simulation of the process model, a simulated wafer pattern on the wafer based on the initial patterning device pattern;

evaluating a second cost function, wherein the second cost function computes a difference between the simulated pattern and the wafer target layout; and adjusting the initial patterning device pattern such that the second cost function is reduced.

7. The method of any of clauses 1-6, wherein the wafer data comprises measurements related to a feature printed on the wafer including a critical dimension, a contour of the feature, and/or a process window.

8. The method of any of clauses 1-7, wherein the measurements are based on an image of the exposed wafer obtained from an e-beam inspection apparatus and/or an optical inspection apparatus.

9. The method of clause 8, wherein the e-beam inspection apparatus is a scanning electron microscope.

10. The method of any of clauses 1-9, wherein the wafer target layout includes a pattern corresponding to a design layout that will be printed on the wafer subjected to the patterning process.

11. The method of any of clauses 1-10, wherein the process model is a mask model, an optical model, a resist model, and/or an etch model.

12. The method of any of clauses 1-11, wherein the process model is a physics based model and/or a machine learning model.

13. A method for training an inverse process model of a patterning process, the method comprising:

obtaining a first patterning device pattern from simulation of an inverse lithographic process that predicts a patterning device pattern based on a wafer target layout;

receiving, via a processor, wafer data corresponding to a wafer exposed using the first patterning device pattern; and training, via the processor, an inverse process model configured to predict a second patterning device pattern using the wafer data related to the exposed wafer and the first patterning device pattern.

14. The method of clause 13, wherein the inverse process model is a machine learning model configured to predict the second patterning device pattern using the wafer target layout as input.

15. The method of clause 14, wherein the machine learning model is a convolutional neural network.

16. The method of clause 15, wherein the training the inverse process model is an iterative process, an iteration comprising:

determining values of model parameters of the convolutional neural network based on the wafer data and the patterning device pattern; and adjusting the values of the model parameters until a first cost function of the convolutional neural network is improved.

17. The method of clause 16, wherein the first cost function is a difference between the patterning device pattern and a predicted patterning device pattern obtained from the convolution neural network.

18. The method of any of clauses 13-17, wherein the wafer data comprises measurements related to a feature printed on the wafer including a critical dimension, a contour of the feature, and/or a process window.

19. The method of any of clauses 13-18, wherein the wafer target layout includes a pattern corresponding to a design layout that will be printed on the wafer subjected to the patterning process.

20. The method of any of clauses 13-19, further comprising predicting, via simulation of the trained inverse process model, a patterning device pattern based on a given wafer target layout.

21. A method for determining a patterning device layout for a patterning process, the method comprising:

obtaining an initial patterning device pattern from a trained inverse process model that predicts the initial patterning device pattern from wafer target layout;

determining, via simulation of a calibrated process model, a patterning device layout based on the initial patterning device pattern and a wafer target layout.

22. The method of clause 21, wherein the determining of the patterning device layout is an iterative process, an iteration comprises:

obtaining the initial patterning device pattern;

determining, via simulation of the calibrated process model, a simulated wafer pattern on the wafer based on the initial patterning device pattern;

evaluating a cost function, wherein the cost function computes a difference between the simulated pattern and the wafer target layout; and adjusting the initial patterning device pattern such that the cost function is reduced.

23. The method of any of clauses 21-22, wherein the calibrated process model of the patterning process is calibrated based on wafer data related to the exposed wafer and the patterning device pattern from a simulation of an inverse lithographic process.

24. The method of any of clauses 21-23, wherein the wafer data comprises measurements related to a feature printed on the wafer including a critical dimension, a contour of the feature, and/or a process window.

25. The method of clause 21, wherein the initial patterning device pattern is a final patterning device layout that does not require adjustment to the initial patterning device pattern.

The concepts disclosed herein may simulate or mathematically model any generic imaging system for imaging sub wavelength features, and may be especially useful with emerging imaging technologies capable of producing increasingly shorter wavelengths. Emerging technologies already in use include EUV (extreme ultra violet), DUV lithography that is capable of producing a 193 nm wavelength with the use of an ArF laser, and even a 157 nm wavelength with the use of a Fluorine laser. Moreover, EUV lithography is capable of producing wavelengths within a range of 20-5 nm by using a synchrotron or by hitting a material (either solid or a plasma) with high energy electrons in order to produce photons within this range.

While the concepts disclosed herein may be used for imaging on a substrate such as a silicon wafer, it shall be understood that the disclosed concepts may be used with any type of lithographic imaging systems, e.g., those used for imaging on substrates other than silicon wafers.

The descriptions above are intended to be illustrative, not limiting. Thus, it will be apparent to one skilled in the art that modifications may be made as described without departing from the scope of the claims set out below.

What is claimed is:

1. A method comprising:

obtaining a patterning device pattern from simulation of an inverse lithographic process that predicts the patterning device pattern based on a wafer target layout, wherein the patterning device pattern is configured to be transferred, by a lithographic apparatus, from a patterning device onto a wafer with the aim to form the wafer target layout and the simulation of the inverse lithographic process involves simulation using one or more selected from:
  a mask model configured to predict a mask image corresponding to the patterning device pattern,
  an optical model configured to predict an aerial image corresponding to the patterning device pattern,
  a resist model configured to predict a resist image corresponding to the patterning device pattern, or
  an etch model configured to predict an etch image corresponding to the patterning device pattern;
receiving, by a hardware processor system, wafer data corresponding to a wafer exposed using the patterning device pattern; and
calibrating, by the hardware processor system, a process model of a patterning process based on the wafer data related to the exposed wafer and the patterning device pattern.

2. The method of claim 1, wherein the calibrating the process model is an iterative process, an iteration comprising:
  determining values of model parameters of the process model based on the wafer data and the patterning device pattern; and
  adjusting the values of the model parameters until a first cost function of the process model is improved.

3. The method of claim 2, wherein the first cost function is a difference between the wafer data and a predicted pattern obtained from the calibrated process model.

4. The method of claim 3, wherein the difference is measured in terms of a performance parameter of the patterning process, the performance parameter including at least one selected from: a contour of a feature, critical dimension, and/or a process window.

5. The method of claim 1, wherein the simulation of the inverse lithographic process is an iterative process, an iteration comprising:
  obtaining an initial patterning device pattern;
  determining, via simulation using the process model, a simulated wafer pattern based on the initial patterning device pattern;
  evaluating a second cost function, wherein the second cost function computes a difference between the simulated wafer pattern and the wafer target layout; and
  adjusting the initial patterning device pattern such that the second cost function is reduced.

6. The method of claim 1, wherein the wafer data comprises measurements related to a feature printed on the wafer including a critical dimension, a contour of the feature, and/or a process window.

7. The method of claim 6, wherein the measurements are based on an image of the exposed wafer obtained from an e-beam inspection apparatus and/or an optical inspection apparatus.

8. The method of claim 7, wherein the e-beam inspection apparatus is a scanning electron microscope.

9. The method of claim 1, wherein the process model is a mask model, an optical model, a resist model, and/or an etch model.

10. The method of claim 1, wherein the process model is a physics based model and/or a machine learning model.

11. The method of claim 10, wherein the process model is a machine learning model and the machine learning model is a convolutional neural network.

12. A computer program product comprising a non-transitory computer readable medium having instructions therein, the instructions, when executed by a computer system, configured to cause the computer system to at least:
  obtain a patterning device pattern from simulation of an inverse lithographic process that predicts the patterning device pattern based on a wafer target layout, wherein the patterning device pattern is configured to be transferred, by a lithographic apparatus, from a patterning device onto a wafer with the aim to form the wafer target layout and the simulation of the inverse lithographic process involves use of one or more selected from:
    a mask model configured to predict a mask image corresponding to the patterning device pattern,
    an optical model configured to predict an aerial image corresponding to the patterning device pattern,
    a resist model configured to predict a resist image corresponding to the patterning device pattern, or
    an etch model configured to predict an etch image corresponding to the patterning device pattern;
  receive wafer data corresponding to a wafer exposed using the patterning device pattern; and
  calibrate a process model of a patterning process based on the wafer data related to the exposed wafer and the patterning device pattern.

13. The computer program product of claim 12, wherein the instructions configured to cause the computer system to calibrate the process model are configured to do so in an iterative manner, an iteration comprising:
  determination of values of model parameters of the process model based on the wafer data and the patterning device pattern; and
  adjustment of the values of the model parameters until a first cost function of the process model is improved.

14. The computer program product of claim 13, wherein the first cost function is a difference between the wafer data and a predicted pattern obtained from the calibrated process model.

15. The computer program product of claim 12, wherein the simulation of the inverse lithographic process is an iterative process, an iteration comprising:
  obtaining of an initial patterning device pattern;
  determination, via simulation using the process model, a simulated wafer pattern based on the initial patterning device pattern;
  evaluation of a second cost function, wherein the second cost function computes a difference between the simulated wafer pattern and the wafer target layout; and
  adjustment of the initial patterning device pattern such that the second cost function is reduced.

16. The computer program product of claim 12, wherein the wafer data comprises measurements related to a feature printed on the wafer including a critical dimension, a contour of the feature, and/or a process window.

17. The computer program product of claim 12, wherein the process model is a mask model, an optical model, a resist model, and/or an etch model.

18. The computer program product of claim 12, wherein the process model is a machine learning model.

19. The computer program product of claim 18, wherein the machine learning model is a convolutional neural network.

20. The computer program product of claim 14, wherein the difference is measured in terms of a performance parameter of the patterning process, the performance parameter including at least one selected from: a contour of a feature, critical dimension, and/or a process window.

\* \* \* \* \*